US012353783B2

(12) United States Patent
Ajanohoun et al.

(10) Patent No.: US 12,353,783 B2
(45) Date of Patent: Jul. 8, 2025

(54) TIME SYNCHRONIZATION FOR SHARED EXTENDED REALITY EXPERIENCES

(71) Applicant: Snap Inc., Santa Monica, CA (US)

(72) Inventors: Jordy Innocentius Ajanohoun, Vienna (AT); Markus Diem, Vienna (AT); Georgios Evangelidis, Vienna (AT); Matthew Penney, Vienna (AT)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/481,804

(22) Filed: Oct. 5, 2023

(65) Prior Publication Data

US 2025/0068374 A1    Feb. 27, 2025

(30) Foreign Application Priority Data

Aug. 24, 2023  (GR) ............................... 20230100691

(51) Int. Cl.
*G06F 3/01*  (2006.01)
*G06F 3/14*  (2006.01)

(52) U.S. Cl.
CPC ............ *G06F 3/1454* (2013.01); *G06F 3/011* (2013.01)

(58) Field of Classification Search
CPC ........ G06F 3/1454; G06F 3/011; G06F 3/012; G06F 3/013; G06F 3/0346; G06F 3/04815; G06F 2111/18; G06F 1/12; G06F 1/04; G06F 1/14; G06F 1/163; G06F 1/165; G06F 15/17325; G02B 27/017; G02B 27/0093; G02B 27/01; G02B 2027/0138; G02B 2027/0178; G02B 2027/0187; G06T 2219/024; G06T 19/006; G06T 7/00;

(Continued)

(56) References Cited

U.S. PATENT DOCUMENTS 11,587,255 B1   2/2023 Micusik et al.
2012/0105473 A1*  5/2012 Bar-Zeev .................. G06T 1/20
345/633

(Continued)

FOREIGN PATENT DOCUMENTS

WO    WO-2025043116 A1    2/2025

OTHER PUBLICATIONS

Micusik, Branislav, "Ego-Motion Alignment from Face Detections for Collaborative Augmented Reality", [Online] Retrieved from the Internet: <URL: https://arxiv.org/abs/2010.02153v1>, (Oct. 5, 2020), 25 pgs.

(Continued)

*Primary Examiner* — Nitin Patel
*Assistant Examiner* — Amen W Bogale
(74) *Attorney, Agent, or Firm* — SCHWEGMAN LUNDBERG & WOESSNER, P.A.

(57) ABSTRACT

A first extended reality (XR) device and a second XR device are colocated in an environment. The first XR device captures sensory data of a wearer of the second XR device. The sensory data is used to determine a time offset between a first clock of the first XR device and a second clock of the second XR device. The first clock and the second clock are synchronized based on the time offset and a shared coordinate system is established. The shared coordinate system enables alignment of virtual content that is simultaneously presented by the first XR device and the second XR device based on the synchronization of the first clock and the second clock.

20 Claims, 13 Drawing Sheets

(58) Field of Classification Search
CPC ...... G06T 7/70; H04N 13/344; H04N 13/383; G06V 20/20; A63F 13/44
See application file for complete search history.

(56) References Cited

U.S. PATENT DOCUMENTS

| | | |
|---|---|---|
| 2017/0371406 A1 | 12/2017 | Yang et al. |
| 2020/0249748 A1 | 8/2020 | Ranganathan et al. |
| 2020/0309944 A1 | 10/2020 | Thoresen et al. |
| 2021/0065696 A1 | 3/2021 | Bromand et al. |
| 2021/0248827 A1 | 8/2021 | Baier et al. |
| 2021/0263584 A1* | 8/2021 | Himane ................. G06F 3/016 |
| 2022/0392169 A1* | 12/2022 | Simpson ................. A63F 13/26 |

OTHER PUBLICATIONS

"International Application Serial No. PCT/US2024/043486, International Search Report mailed Nov. 26, 2024", 5 pgs.
"International Application Serial No. PCT/US2024/043486, Written Opinion mailed Nov. 26, 2024", 8 pgs.

\* cited by examiner

TIME SYNCHRONIZATION FOR SHARED EXTENDED REALITY EXPERIENCES

CLAIM OF PRIORITY

This application claims the benefit of priority to Greece patent application Ser. No. 20230100691, filed Aug. 24, 2023, which is incorporated herein by reference in its entirety.

TECHNICAL FIELD

Subject matter disclosed herein relates generally to extended reality (XR) technology. More specifically, but not exclusively, the subject matter addresses devices, systems, and methods for providing shared XR experiences.

BACKGROUND

Some XR devices enable colocated users to have a shared XR experience. An augmented reality (AR) device is a type of XR device that enables a user to observe a real-world scene while simultaneously seeing virtual content that may be aligned to objects, images, or environments in the field of view of the AR device. In the context of AR, examples of shared experiences include an AR tour in which attendees see the same virtual content overlaying the real world, AR multiplayer gaming in which players can see and interact with the same virtual game elements overlaid on the real world, and a collaborative design project in which designers gather in the same room and use their AR devices to visualize and manipulate the same three-dimensional (3D) model of a design.

To provide a shared experience that is useful, entertaining, or immersive, local coordinate systems of respective XR devices may be aligned with respect to each other. Furthermore, clocks of the respective XR devices may be synchronized, e.g., to ensure that different users see the same virtual content at the same time.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
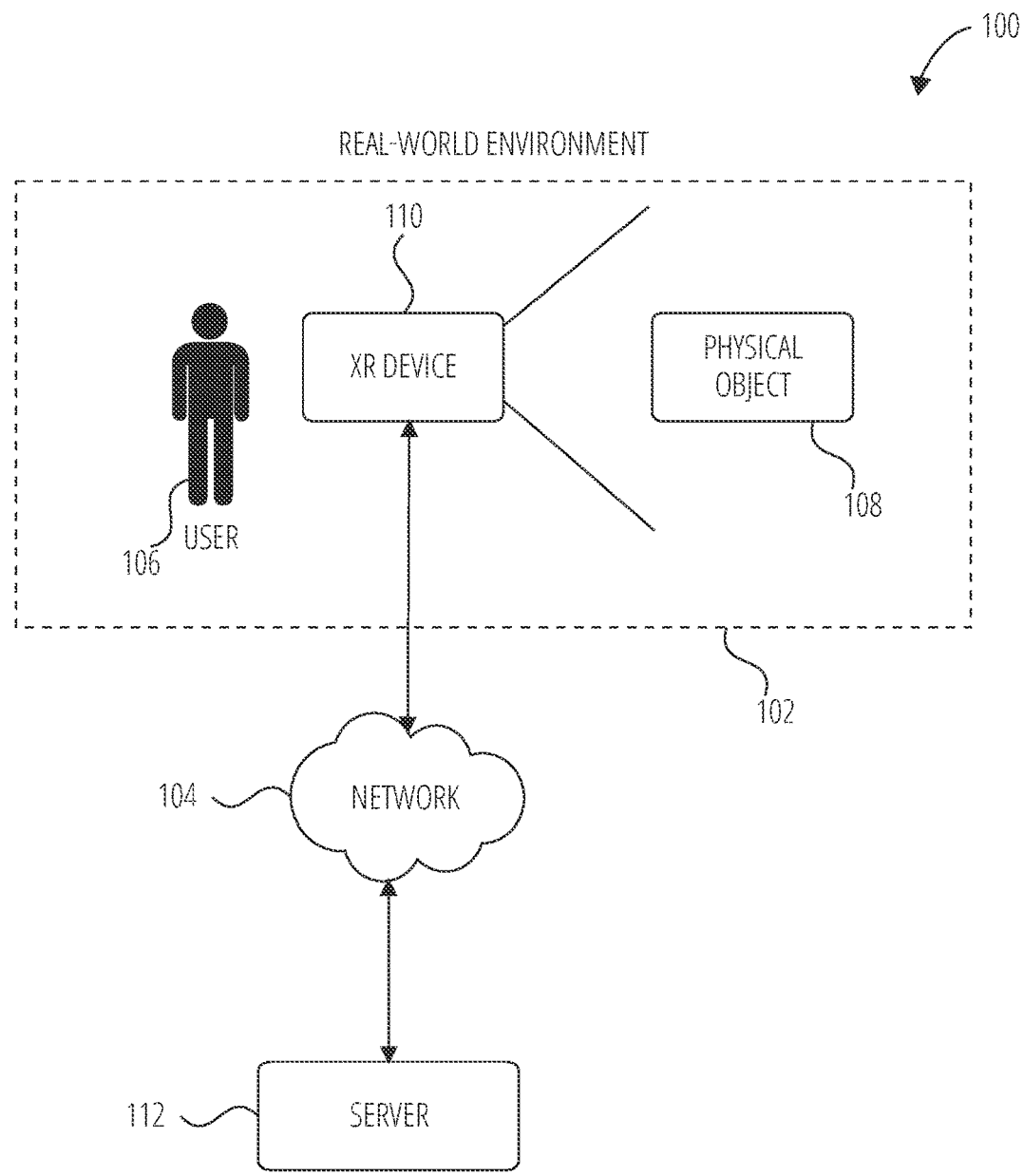
FIG. 1 is a diagram illustrating a network environment for operating an XR device, according to some examples.

The description that follows describes systems, methods, devices, techniques, instruction sequences, or computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects, scenes, or environments that reside in the real world are "augmented," modified, or enhanced by computer-generated digital content (also referred to as virtual content). The term "augmentation" is used to refer to any such digital or virtual content. An AR device can enable a user to observe a real-world scene while simultaneously seeing virtual content that may be aligned to objects, images, or environments in the field of view of the AR device. AR can also refer to a system that enables a combination of real and virtual worlds, real-time interaction, and 3D representation of virtual and real objects. A user of an AR system can perceive virtual content that appears to be attached to or to interact with a real-world physical object. The term "AR application" is used herein to refer to a computer-operated application that enables an AR experience.

The term "virtual reality" (VR) is used herein to refer to a simulation experience of a virtual world environment that is distinct from the real-world environment. Computer-generated digital content is displayed in the virtual world environment. A VR device can thus provide a more immersive experience than an AR device. The VR device may block out the field of view of the user with virtual content that is displayed based on a position and orientation of the VR device. VR also refers to a system that enables a user of a VR system to be completely immersed in the virtual world environment and to interact with virtual objects presented in the virtual world environment.

In general, AR and VR devices are referred to as "extended reality" (XR) devices, and related systems are referred to as XR systems. While examples described in the present disclosure focus primarily on XR devices that provide an AR experience, it will be appreciated that at least some aspects of the present disclosure may also be applied to other types of XR experiences.

The term "user session" is used herein to refer to an operation of an application during periods of time. For example, a user session may refer to an operation of an AR application executing on a head-wearable XR device between the time the user puts on the XR device and the time the user takes off the head-wearable device. In some examples, the user session starts when the XR device is turned on or is woken up from sleep mode and stops when the XR device is turned off or placed in sleep mode. In other examples, the session starts when the user runs or starts an AR application, or runs or starts a particular feature of the AR application, and stops when the user ends the AR application or stops the particular features of the AR application. In some examples, and as described further below, a pose sharing session may be established while a user session is in progress to enable an XR device to receive pose data from another XR device.

The term "SLAM" (Simultaneous Localization and Mapping) is used herein to refer to a system used to understand and map a physical environment in real-time. It uses sensors such as cameras, depth sensors, and Inertial Measurement Units (IMUs) to capture data about the environment and then uses that data to create a map of the surroundings of a device while simultaneously determining the device's location within that map. This allows, for example, an XR device to accurately place virtual content, e.g., digital objects, in the real world and track their position as a user moves and/or as objects move.

The term "Inertial Measurement Unit" (IMU) is used herein to refer to a sensor or device that can report on the inertial status of a moving body, including one or more of the acceleration, velocity, orientation, and position of the moving body. In some examples, an IMU enables tracking of movement of a body by integrating the acceleration and the angular velocity measured by the IMU. The term "IMU" can also refer to a combination of accelerometers and gyroscopes that can determine and quantify linear acceleration and angular velocity, respectively. The values obtained from one or more gyroscopes of an IMU can be processed to obtain data including the pitch, roll, and heading of the IMU and, therefore, of the body with which the IMU is associated. Signals from one or more accelerometers of the IMU also can be processed to obtain data including velocity and/or displacement of the IMU and, therefore, of the body with which the IMU is associated.

The term "VIO" (Visual-Inertial Odometry) is used herein to refer to a technique that combines data from an IMU and a camera to estimate the pose of an object in real time. The term "pose" refers to the position and orientation of the object, e.g., the three-dimensional position or translation (x, y, z) and orientation (yaw, pitch, roll), relative to a reference frame. A VIO system typically uses computer vision algorithms to analyze camera images and estimate the movement and position of the XR device, while also using IMU data to improve the accuracy and reliability of the estimates. By combining visual and inertial data, VIO may provide more robust and accurate tracking than using either sensor modality alone. In some examples, a VIO system may form part of a SLAM system, e.g., to perform the "Localization" function of the SLAM system.

The term "six degrees of freedom" (also referred to hereafter simply as a "6 DOF") is used herein to refer to six degrees of freedom of movement. In the context of an XR device, 6 DOF pose tracking may refer to the tracking of the pose of an object along three degrees of translational motion and three degrees of rotational motion.

As mentioned, some XR devices enable colocated users (e.g., users in the same room, hall, field, or park) to have a shared XR experience. In an AR context, this can sometimes be referred to as "collaborative AR," as multiple users may participate in the same AR environment. These shared experiences or environments can be useful for various types of activities, such as gaming, education, entertainment (e.g., providing colocated AR filters or "lenses"), or design.

To create a shared environment that is spatially and temporally consistent for multiple users, it may be necessary to align the perspectives of the users. An XR device may have a pose tracker, often referred to as an "ego-pose tracker," that identifies and tracks the position (e.g., 3D location) and typically also orientation (e.g., 3D rotation) of the XR device in an environment. This allows the XR device to understand where it is in the real world and how it is oriented. With multiple XR devices, each XR device may be running its own pose tracker independently, based on its own local coordinate system. Local coordinate systems typically operate by defining starting coordinates based on where a user session started and multiple XR devices in the same environment may thus have significantly different local "worlds." Accordingly, these local coordinate systems may need to be aligned or adjusted to a common reference system.

Local coordinate systems can be spatially and temporally aligned. This can be referred to as ego-motion alignment. Spatial alignment refers to the synchronization of the local coordinate systems such that they agree on where objects are located in space, e.g., by transforming each pose in the local world of an XR device to a common global coordinate system. Temporal alignment means that the XR devices should agree on when events are occurring. For example, the clocks of two XR devices can be synchronized such that, if a user of one of the XR devices moves a virtual object during a shared experience, the user of the other XR device sees this movement at the same time, thereby ensuring a seamless shared experience.

Many XR experiences require accurate time synchronization. For example, for computer vision algorithms or AR game logic to function as intended, XR device clocks should preferably be no more than 30 ms apart (this may depend on the implementation). Moreover, an ego-motion alignment algorithm may rely on accurate time synchronization, e.g., an ego-motion alignment algorithm may calculate an alignment transformation based on the assumption that two XR devices are time synchronized.

Clock synchronization can be performed through synchronization with an external source. Network Time Protocol (NTP) is commonly used for such external synchronization. NTP is designed to synchronize the clocks of devices over a network. NTP uses a hierarchical, client-server architecture. At the top of the hierarchy, there are reference clocks or time servers, which provide accurate time signals. Servers lower down in the hierarchy then receive these time signals and distribute them to clients still further down in the hierarchy. When an NTP client wants to synchronize its clock, it sends a request to an NTP server, which responds with timestamp information enabling the client to adjust its clock.

However, there are technical challenges associated with synchronizing the clocks of multiple XR devices using external source techniques, such as NTP. For example, one or more of network congestion, network latency, asymmetric routes, differences in processing time, and NTP server differences can cause time offsets between these XR devices. For example, two XR devices in the same room may use NTP to adjust their clocks, but there can still ultimately be a discrepancy of about 100 ms (this is merely an example) between the adjusted clocks of the two XR devices due to one or more of the abovementioned factors. Moreover, it may not always be possible for all XR devices to connect to the relevant network, e.g., to connect to a local Wi-Fi™ network for NTP synchronization via the Internet.

Time offsets between XR devices participating in a shared XR experience can result in technical problems, such as virtual content appearing at different times or in different places, or audio-visual lag, in turn reducing the quality or usefulness of the users' experience. As mentioned above, a precondition of spatial alignment may be that the XR devices in question are time-synchronized. Accordingly, time offsets may also result in errors with respect to spatial alignment, which can lead to virtual content being incorrectly positioned, e.g., misaligned.

Examples described herein leverage user-in-the-loop techniques for time synchronization to provide shared XR experiences with respect to colocated XR devices. The present disclosure describes image-based and audio-based techniques utilizing user-in-the-loop to estimate or determine real time differences between two or more colocated XR devices.

The image-based or audio-based techniques may involve capturing, observing, or recording sensory data of a wearer of an XR device. In some examples, XR devices that are to be aligned are present in the same location, allowing for sensory data to be captured, observed, or recorded to facilitate time synchronization, e.g., by correlating data between different XR devices. In this context, the term "sensory data" may refer to one or both of image data and audio data. The image data may include, for example, images depicting a visual feature of the wearer, e.g., facial landmarks or landmarks on the XR device worn by the wearer. The audio data may include, for example, a sound made, generated, or caused to be generated by the wearer of the XR device.

In some examples, a first XR device and a second XR device are colocated in an environment. The first XR device captures sensory data of a wearer of the second XR device. The sensory data is used to determine a time offset between a first clock of the first XR device and a second clock of the second XR device. Examples of the manner in which the sensory data may be used to determine the time offset are described herein.

The first clock and the second clock are synchronized based on the time offset and a shared coordinate system is established. The shared coordinate system enables alignment of virtual content that is simultaneously presented by the first XR device and the second XR device based on the synchronization of the first clock and the second clock. The shared coordinate system may be a global coordinate system to which local coordinate systems of the respective XR devices are aligned. A local coordinate system of one of the XR devices may be selected as the global coordinate system.

The method may include causing presentation of the virtual content by the first XR device. Based on the shared coordinate system and the synchronization of the first clock and the second clock, the virtual content is presented substantially in a same place and substantially at a same time by the second XR device.

In an image-based technique (which may also be referred to as a visual technique), a wearer of a first head-mounted XR device and a wearer of a second-mounted XR device may look at each other. This allows the XR devices to capture observations useful for globally correlating trajectories of the XR devices to estimate a time offset between respective clocks of the XR devices. In some examples, the XR devices may be moving relative to each other while observations are being captured.

Accordingly, in the image-based technique, the sensory data of the wearer of the second XR device may comprise images of the wearer, e.g., images captured at different points in time. The images may depict or include a visual feature of the wearer. The visual feature may, for example, be a landmark on the facial region of the wearer, e.g., a point on a facial region of the wearer, such as the nose. The visual feature may be a point on the second XR device itself. Accordingly, sensory data of a wearer may be a feature of the XR device worn by the wearer.

Using the sensory data to determine the time offset may include processing each image to determine a time-indexed position of the visual feature of the wearer of the second XR device based on the first clock. Each time-indexed position may include an (x, y) coordinate of the visual feature.

Based on the time-indexed position of the visual feature of the wearer of the second XR device for each image, an estimated trajectory of the second XR device may be generated. The estimated trajectory may thus be based on observations captured by the first XR device.

A pose trajectory of the second XR device may be accessed. The pose trajectory may include a time-stamped series of poses (e.g., 6 DOF poses) of the second XR device covering a period of time. The time offset may then be used to match the captured positions of the visual feature, e.g., the positions providing the estimated trajectory of the second XR device, with the pose trajectory of the second XR device.

In some examples, the pose, e.g., the 6 DOF pose, of the second XR device is shared with the first XR device to provide access to the pose trajectory of the second XR device. The pose trajectory may be used together with the estimated trajectory that is based on observations of the visual feature to estimate the time offset between the two XR devices. The method may include matching each time-indexed position to a corresponding pose in the pose trajectory of the second XR device.

The method may include using the time-indexed positions and the time offset to align the pose trajectory (e.g., 6 DOF poses) of the second XR device with a pose trajectory (e.g., 6 DOF poses) of the first XR device. The alignment process may involve ego-motion alignment, as described according to some examples herein.

In some examples, different pose trajectories may be simulated. The method may include globally matching observations from the first XR device to poses of the second XR device with a plurality of different time offsets. These different time offsets may be simulated, and the most promising, or best scoring, solution may be selected or identified as the real (or best estimate) time offset using ego-motion alignment, e.g., an ego-motion alignment algorithm.

Aligning the pose trajectory of the second XR device with the pose trajectory of the first XR device may include generating an alignment transformation between a local coordinate system of the second XR device and a local coordinate system of the first XR device. The alignment transformation may thus be an output or result of the ego-motion alignment operation.

In some examples, the first XR device and/or the second XR device may prompt its wearer to move, or to look at the wearer of the other XR device, or both, thereby facilitating the time-synchronization and alignment process.

Where multiple XR devices are in the same environment, e.g., in the same room or together in a park, audio signals can be correlated between the XR devices to perform clock synchronization. In an audio-based technique, a wearer of an XR device may generate sound to facilitate synchronization. Examples of such sounds include sound made by the wearer themselves, e.g., by clapping their hands or saying a predefined word, such as "hello" or "let's sync," a sound generated by the XR device, e.g., a predetermined tone played via a speaker of the XR device, or a sound generated by another device at the same or substantially the same location as the wearer. Accordingly, in this context, the sensor data of the wearer may be any suitable sound generated by the wearer, and the phrase "generated by the wearer" may thus refer to audio originating from the wearer or a device of the wearer.

In some examples, when a first XR device and a second XR device are establishing a shared coordinate system, the wearer of the second XR device generates a sound, and the first XR device captures an audio signal representing the sound using one or more microphones. The second XR device may also capture an audio signal representing the sound using one or more microphones, allowing the two XR devices to correlate their microphone streams to perform time synchronization.

In some examples, the first XR device captures or generates a first time-indexed audio signal based on a first clock of the first XR device, and the second XR device captures or generates a second time-indexed audio signal based on a second clock of the second XR device. The first XR device (or a server that performs synchronization) may receive, from the second XR device, the second time-indexed audio signal and then compare the first time-indexed audio signal and the second time-indexed audio signal to determine the time offset. The audio signals may be compared using a cross-correlation coefficient.

Audio signals have a relatively high temporal resolution, which may allow for high-accuracy clock synchronization. However, depending on the accuracy required, it may be necessary to compensate or account for the time it takes for sound to travel between devices or users. A distance between the first XR device and the second XR device may be determined or estimated. A method may include adjusting the time offset to compensate for audio latency based on the distance between the first XR device and the second XR device in the environment. For example, the first XR device may include a microphone array that enables it to perform sound source localization (SSL) and estimate the distance to the second XR device.

In some examples, the first XR device or the second XR device may prompt its wearer to make or generate a predetermined sound, with the XR devices then "listening" for that predetermined sound, thereby facilitating the time-synchronization and alignment process.

Examples described herein may address or alleviate technical problems caused by significant or unsatisfactory time offsets between XR devices, such as misalignment of shared virtual content or audio-visual lag during an XR experience. One or more of the methodologies described herein may obviate a need for certain efforts or computing resources, e.g., by reducing network communications through "user-in-the-loop" driven synchronization. Examples of such computing resources include processor cycles, network traffic, memory usage, data storage capacity, power consumption, network bandwidth, and cooling capacity.

FIG. 1 is a network diagram illustrating a network environment 100 suitable for operating an XR device 110, according to some examples. The network environment 100 includes an XR device 110 and a server 112, communicatively coupled to each other via a network 104. The server 112 may be part of a network-based system. For example, the network-based system may be or include a cloud-based server system that provides additional information, such as virtual content (e.g., two-dimensional (2D) or 3D models of virtual objects, or augmentations to be applied as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human). The user 106 is not part of the network environment 100, but is associated with the XR device 110. For example, where the XR device 110 is a head-wearable apparatus, the user 106 wears the XR device 110 during a user session. In such cases, the user 106 can be referred to as the "wearer" of the XR device 110.

The user 106 operates an application of the XR device 110, referred to herein as an AR application. The AR application may be configured to provide the user 106 with an experience triggered or enhanced by a physical object 108, such as a two-dimensional physical object (e.g., a picture), a three-dimensional physical object (e.g., a statue, another person, a table, or a landmark), a location (e.g., a factory), or any reference points or zones (e.g., perceived corners of walls or furniture, or Quick Response (QR) codes) in the real-world physical environment. For example, the user 106 may point a camera of the XR device 110 to capture an image of the physical object 108 and a virtual overlay may be presented over the physical object 108 via the display. Experiences may also be triggered or enhanced by a hand or other body part of the user 106, e.g., the XR device 110 may detect and respond to hand gestures.

The XR device 110 includes tracking components (not shown in FIG. 1). The tracking components track the pose (e.g., position, orientation, and location) of the XR device 110 relative to a real-world environment 102 using image sensors (e.g., depth-enabled 3D camera, and image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102.

In some examples, the server 112 may be used to detect and identify the physical object 108 based on sensor data (e.g., image and depth data) from the XR device 110, and determine a pose of the XR device 110 and the physical object 108 based on the sensor data. The server 112 can also generate a virtual object based on the pose of the XR device 110 and the physical object 108.

In some examples, the server 112 communicates a virtual object to the XR device 110. The XR device 110 or the server 112, or both, can also perform image processing, object detection, and object tracking functions based on images captured by the XR device 110 and one or more parameters internal or external to the XR device 110. The object recognition, tracking, and AR rendering can be performed on either the XR device 110, the server 112, or a combination of the XR device 110 and the server 112. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

As described in greater detail elsewhere herein, the XR device 110 may be enabled to provide a shared experience in which the user 106 of the XR device 110 sees and/or interacts with virtual content, overlaid on the real-world environment 102, that is also shown to a user of another XR device. The XR device 110 can therefore, in some examples, connect with other XR devices, e.g., over a network, to provide shared or collaborative experiences. Connecting with another XR device may involve spatially and temporally aligning a reference system of the XR device 110 with that of the other XR device. The server 112 may provide some functionality to enable such experiences.

Any of the machines, components, or devices shown in FIG. 1 may be implemented in a general-purpose computer modified (e.g., configured or programmed) by software to be a special-purpose computer to perform one or more of the functions described herein for that machine, component, or device. For example, a computer system able to implement any one or more of the methodologies described herein is discussed below with respect to FIG. 13. Moreover, any two or more of the machines, components, or devices illustrated in FIG. 1 may be combined into a single machine, and the functions described herein for any single machine, component, or device may be subdivided among multiple machines, components, or devices.

The network 104 may be any network that enables communication between or among machines (e.g., server 112), databases, or devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
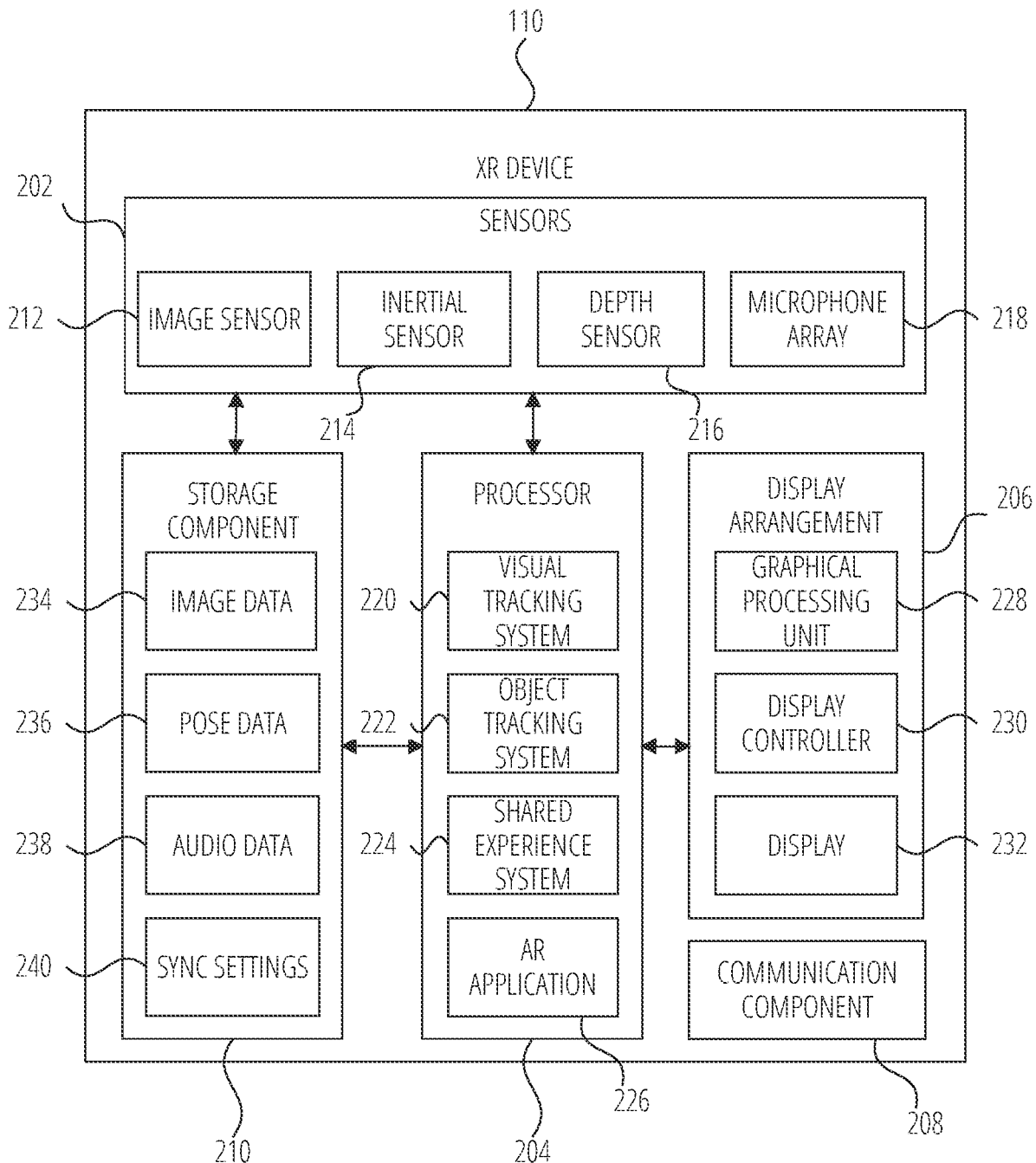
FIG. 2 is a block diagram illustrating components of an XR device, according to some examples.

FIG. 2 is a block diagram illustrating components (e.g., parts, modules, or systems) of the XR device 110, according to some examples. The XR device 110 includes sensors 202, a processor 204, a display arrangement 206, a communication component 208, and a storage component 210. It will be appreciated that FIG. 2 is not intended to provide an exhaustive indication of components of the XR device 110.

The sensors 202 include one or more image sensors 212, one or more inertial sensors 214, one or more depth sensors 216, and a microphone array 218. The image sensors 212 may include, for example, one or more of a color camera, a thermal camera, a depth sensor, and one or more grayscale, global shutter tracking cameras. One or more cameras of the image sensor 212 may be used to capture image data that provide observations of visual features, such as landmarks on the body of another user, reference points, or encoded information. The inertial sensor 214 may include one or more of a gyroscope, accelerometer, and a magnetometer. In some examples, the inertial sensor 214 includes one or more IMUs.

The depth sensor 216 may include one or more of a structured-light sensor, a time-of-flight sensor, passive stereo sensor, and an ultrasound device. The microphone array 218 may include an arrangement of microphones incorporated into the XR device 110 to provide audio capture capabilities, e.g., for picking up voice commands, performing spatial audio recognition or SSL, noise cancellation, echo reduction, or sound scene analysis.

Other examples of sensors 202 include a proximity or location sensor (e.g., near field communication, GPS, Bluetooth™, Wi-Fi™), eye tracking sensors, other types of audio sensors (e.g., one or more other microphones), or any suitable combination thereof. It is noted that the sensors 202 described herein are for illustration purposes and possible sensors of an XR device are thus not limited to the ones described above.

The communication component 208 enables the XR device 110 to communicate with other devices, databases, or servers. The communication component 208 may, for example, include a Bluetooth™ chip or Wi-Fi™ module, that allows the XR device 110 to a communication link with another XR device. For instance, the other XR device may share tracking data with the XR device 110 via the communication link, e.g., to XR device 110 to track a pose of the other XR device to facilitate a shared experience. In some examples, the XR device 110 and the other XR device may communicate via the communication link to establish or maintain a global coordinate system.

The processor 204 implements or executes a visual tracking system 220, an object tracking system 222, a shared experience system 224, and an AR application 226. The visual tracking system 220 estimates and continuously tracks a pose of the XR device 110. For example, the visual tracking system 220 uses data from the image sensor 212 and the inertial sensor 214 to track a location and pose of the XR device 110 relative to a frame of reference (e.g., real-world environment 102 or physical object 108).

In some examples, the visual tracking system 220 uses data from the sensors 202 to determine the pose of the XR device 110, e.g., the 6 DOF pose. The visual tracking system 220 continually gathers and uses updated sensor data describing movements of the XR device 110 to determine updated poses of the XR device 110 that indicate changes in the relative position and orientation of the XR device 110 from the physical objects (real-world objects) in the real-world environment 102. In this way, the visual tracking system 220 can implement an ego-pose tracker of the XR device 110.

The ego-pose tracker can be run as a local background service on the XR device 110 during a user session. The ego-pose tracker may provide, at a certain temporal cadence, the translation and orientation of the XR device 110, e.g., that of the IMU of the XR device 110, expressed in the local "world" (e.g., local coordinate system). The ego-pose tracker may, for example, be provided by a SLAM system, a VIO system, or both.

A SLAM system may be used, e.g., implemented by the processor 204, to understand and map a physical environment in real-time. This allows the XR device 110, for example, to accurately place digital objects overlaid, or superimposed, on the real world and track their position as a user moves and/or as objects move. The XR device 110 may include a "VIO" (Visual-Inertial Odometry) system that combines data from the inertial sensor 214 and image sensor 212 to estimate the position and orientation of an object in real-time. In some examples, a VIO system may form part of a SLAM system, e.g., to perform the "Localization" function of the SLAM system.

The visual tracking system 220 may provide the pose of the XR device 110 to the object tracking system 222, shared experience system 224, the AR application 226, or a graphical processing unit 228 of the display arrangement 206.

The object tracking system 222 enables the detection and tracking of an object, e.g., the physical object 108, a face of a user, or a hand of a user. The object tracking system 222 may include a computer-operated application or system that enables a device or system to detect and track visual features identified in images captured by one or more image sensors 212, such as one or more cameras. In some examples, the object tracking system 222 builds a model of a real-world environment based on the tracked visual features. An object tracking system, such as the object tracking system 222, may implement one or more object tracking machine learning models to track an object in the field of view of a user during a user session. The object tracking machine learning model may comprise a neural network trained on suitable training data to identify and track objects in a sequence of frames captured by the XR device 110. The object tracking system 222 may analyze an object's appearance, motion, landmarks, and/or other features to detect the object and estimate its location or pose in subsequent frames.

The object tracking system 222 may be enabled to detect a face of a person in the field of view of the XR device 110, e.g., using a Convolutional Neural Network (CNN) trained on large datasets of faces. Once a face has been detected in a frame, machine learning techniques may be used to detect a landmark on a facial region. For example, the nose, corner of the mouth, or specific points on a head-mounted device of a person may be detected. The object tracking system 222 may identify and track the position of such landmarks between frames, e.g., using optical flow techniques. Facial landmark detection may provide an (x, y) coordinate of a landmark in a frame or image, and further sensor data (e.g., stereo vision, depth information and ego-pose information) may be used to convert a 2D position to a 3D position.

The object tracking system 222 may also utilize audio data to detect or track the position of an object, or to generate relative directional information indicating where the object is positioned relative to the XR device 110. For example, the microphone array 218 may be used to perform SSL. The microphone array 218 can capture sound originating from a person, e.g., a person in the same room as the wearer of the XR device 110. Time-difference of arrival (TDOA) values may be measured and used to calculate the direction of the sound from the perspective of the XR device 110. Directional information may be combined with other sensor data, e.g., IMU data from the inertial sensor 214, to estimate a position of the person relative to the XR device 110.

The shared experience system 224 enables the XR device 110 to establish a shared coordinate system with another XR device, e.g., by aligning with a global reference system. Establishing a shared coordinate system may involve one or both of spatial alignment and temporal alignment.

The shared experience system 224 may utilize image-based techniques to perform or facilitate ego-motion alignment, as described in greater detail below. In some examples, and as is also described in greater detail below, the shared experience system 224 utilizes audio-based techniques for time-synchronization as part of establishing a shared coordinate system.

Once the XR device 110 and one or more other XR devices have established a shared coordinate system and their clocks have been appropriately synchronized, the shared experience system 224, together with the AR application 226, ensures that virtual content is presented to the user 106 in the correct positions and at the correct time.

For example, while a shared experience is in progress during a user session, the shared experience system 224 may provide the AR application 226 with positional and/or temporal information with respect to a global coordinate system to allow the AR application 226 to render, position, and time the presentation of virtual content based on the global coordinate system (as opposed to, for example, a local coordinate system of the XR device 110).

For instance, the shared experience system 224 may determine an alignment transformation that is required to transform a local pose of the XR device 110, based on its own ego-pose tracker, to a pose expressed in the global or shared coordinate system. The shared experience system 224 may also determine a time offset between the XR device 110 and another XR device such that the AR application 226 can synchronize the presentation of virtual content with corresponding presentation by the other XR device.

For example, the clocks of two XR devices can be synchronized such that, if a user of one of the XR devices moves a virtual object during a shared experience, the user of the other XR device sees this movement at the same time, thereby ensuring a seamless shared experience. Clock synchronization may involve all relevant devices agreeing on a common timestamp reference. The reference may be a global reference time that is separate from the clocks of the XR devices, or the XR devices may agree to synchronize by adjusting to the clock of one of the XR devices.

The AR application 226 may retrieve or generate virtual objects (e.g., a 3D object model). Virtual objects may be retrieved or generated based on an identified physical object 108 or physical environment (or other real-world feature), or based on other aspects of user context. The AR application 226 may also retrieve an augmentation to apply to real-world features, such as the physical object 108. The graphical processing unit 228 causes display of the virtual object, augmentation, or the like. The AR application 226 may include a local rendering engine that generates a visualization of a virtual object overlaid (e.g., superimposed upon, or otherwise displayed in tandem with) on an image of the physical object 108 (or other real-world feature) captured by the image sensor 212. A visualization of the virtual object may be manipulated by adjusting a position of the physical object or feature (e.g., its physical location, orientation, or both) relative to the image sensor 212. Similarly, the visualization of the virtual object may be manipulated by adjusting a pose of the XR device 110 relative to the physical object or feature.

In some examples, the AR application 226 works with the shared experience system 224 to facilitate a shared AR experience as described herein. For example, the XR device 110 and another XR device in the same environment (e.g., in the same room) as the XR device 110 may both have the AR application 226 installed. The XR device 110 and the other XR device establish a shared coordinate system (including, for example, spatial and temporal alignment) and the respective AR applications 226 cause virtual content to be presented in the same places and at the same time to the users of the two XR devices.

The AR application 226 may detect changes made or input provided by users of other XR devices that are part of the shared experience, and adjust virtual content accordingly. For example, the AR application 226 may detect that another user has moved a virtual block from a first position to a second position and cause the virtual content presented to the user 106 of the XR device 110 to be updated to reflect the change substantially in real time, based on the shared coordinate system and synchronized clocks.

The graphical processing unit 228 may include a render engine that is configured to render a frame of a model of a virtual object based on the virtual content provided by the AR application 226 and the pose of the XR device 110 (and, in some cases, the position of a tracked object, e.g., the predicted pose of a hand). In other words, the graphical processing unit 228 uses the three-dimensional pose of the XR device 110 and other data, as required, to generate frames of virtual content to be presented on a display 232. For example, the graphical processing unit 228 uses pose data to render a frame of the virtual content such that the virtual content is presented at an orientation and position in the display 232 to properly augment the user's reality.

As an example, the graphical processing unit 228 may use the pose data indicative of the pose of the XR device 110 and the pose of the hand of the user to render a frame of virtual content such that, when presented on the display 232, the virtual content is caused to be presented to a user so as to overlap with the hand in the user's real-world environment 102. The graphical processing unit 228 can generate updated frames of virtual content based on updated poses of the XR device 110 and updated tracking data generated by the abovementioned tracking components, which reflect changes in the position and orientation of the user in relation to physical objects in the user's real-world environment 102, thereby resulting in a more immersive experience.

Furthermore, when a shared experience is in progress, the graphical processing unit 228 renders frames to ensure that virtual content is shown in the same places and at the same time as the same virtual content is shown to other users participating in the shared experience.

The graphical processing unit 228 may transfer a rendered frame to a display controller 230. The display controller 230 is positioned as an intermediary between the graphical processing unit 228 and the display 232, receives the image data (e.g., rendered frame) from the graphical processing unit 228, re-projects the frame (e.g., by performing a warping process) based on a latest pose of the XR device 110 (and, in some cases, object tracking pose forecasts or predictions), and provides the re-projected frame to the display 232. The display arrangement 206 may include one or more other optical components, such as mirrors, lenses, and so forth, depending on the implementation.

It will be appreciated that, in examples where an XR device includes multiple displays, each display may have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement may deliver separate images or video streams to each eye. Where an XR device includes multiple displays, steps or operations may be carried out separately and substantially in parallel for each display, in some examples, and pairs of features or components may be included to cater for both eyes.

For example, an XR device may capture separate images for a left eye display and a right eye display (or for a set of right eye displays and a set of left eye displays), and render separate outputs for each eye to create a more immersive experience and to adjust the focus and convergence of the overall view of a user for a more natural, three-dimensional view. Thus, while a single set of display arrangement components, or a single set of output images, may be discussed to describe some examples, similar techniques may be applied to cover both eyes by providing a further set of display arrangement components.

The storage component 210 may store various data, such as image data 234, pose data 236, audio data 238, and synchronization settings 240, as shown in FIG. 2. The image data 234 may include images captured using the image sensor 212 or processed image data, e.g., positions of visual features identified in the images. Pose data 236 may include time-stamped poses of the XR device 110 and pose data of other XR devices shared with the XR device 110. The pose data 236 may include pose trajectories used in ego-motion alignment.

The audio data 238 may include time-indexed audio signals, e.g., signals captured or recorded by the XR device 110 or one or more other XR devices as part of a time synchronization process. The synchronization settings 240 may include settings or rules to be applied by the XR device 110 in performing spatial and/or temporal alignment. For example, the synchronization settings 240 may include ego-motion alignment algorithms and clock synchronization algorithms.

Any one or more of the components described herein may be implemented using hardware (e.g., a processor of a machine) or a combination of hardware and software. For example, any component described herein may configure a processor to perform the operations described herein for that component. Moreover, any two or more of these components may be combined into a single component, and the functions described herein for a single component may be subdivided among multiple components. Furthermore, according to various examples, components described herein as being implemented within a single machine, database, or device may be distributed across multiple machines, databases, or devices. A component may be implemented at the XR device, or server-side, or both at the XR device and server-side, depending on the component and design.

Figure 3:
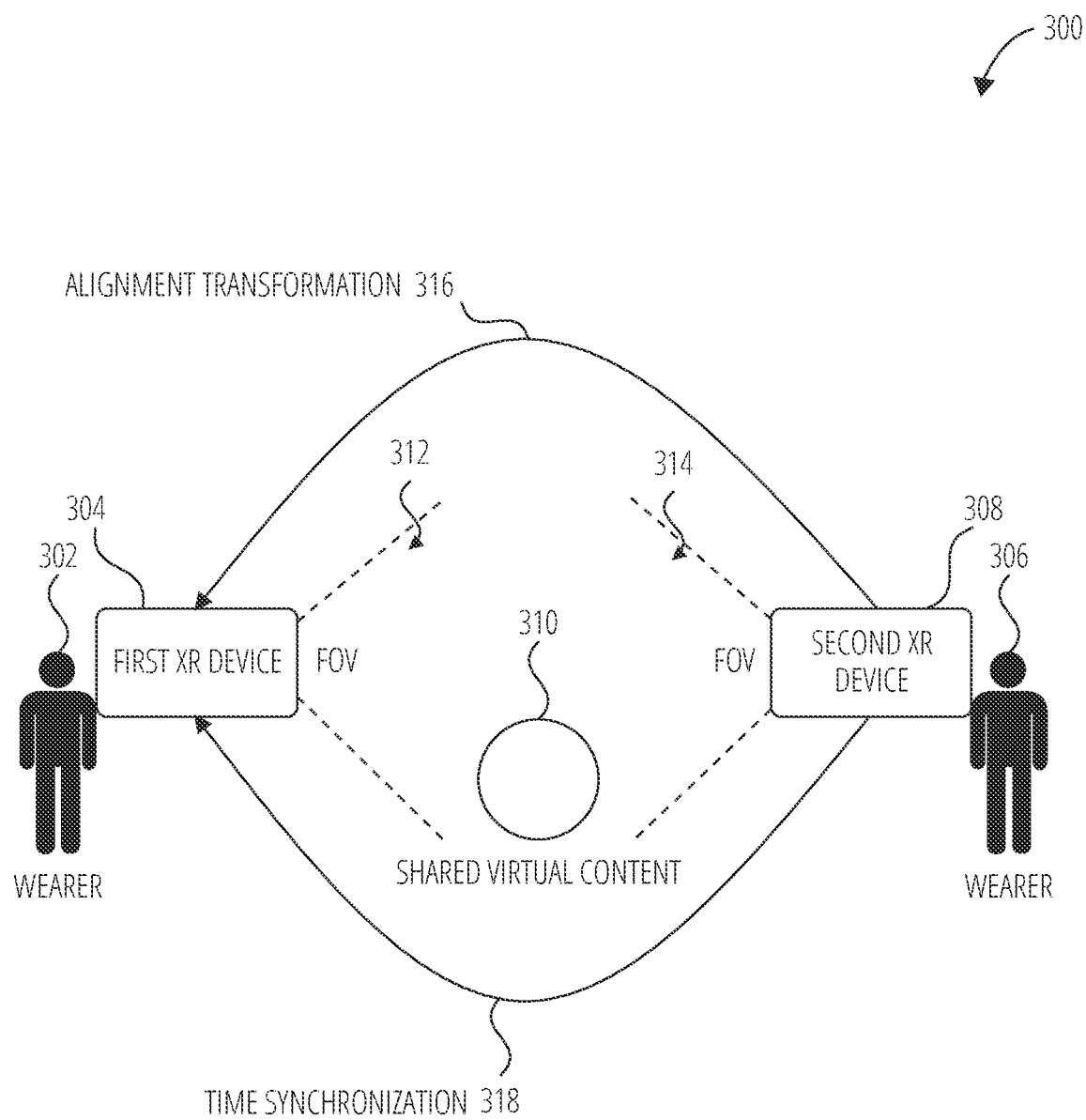
FIG. 3 is a diagram illustrating a shared experience, wherein a shared coordinate system is established and clocks of a first XR device and a second XR device are synchronized, according to some examples.

FIG. 3 is a diagram 300 illustrating a shared experience between a wearer 302 of a first XR device 304 and a wearer 306 of a second XR device 308, according to some examples. The first XR device 304 and the second XR device 308 are both head-mounted AR devices that may include one or more components of the XR device 110 described with reference to FIG. 1 and FIG. 2. Accordingly, reference is made below to certain components shown in FIG. 2.

The shared experience of FIG. 3 is a shared AR experience in which shared virtual content 310 is presented in a field of view 312 of the first XR device 304 and in a field of view 314 of the second XR device 308. The shared virtual content 310 can be overlaid onto real-world objects in the real-world environment, e.g., a room or a park, in which the wearer 302 and the wearer 306 are located. The wearer 302 and the wearer 306 may be able to interact with the shared virtual content 310, e.g., through hand gestures. For example, the wearer 302 and the wearer 306 may be standing at opposite sides of a table and manipulate a virtual object that is presented to appear on a top surface of the table (with the wearer 302 and the wearer 306 viewing the virtual object from opposite sides).

In FIG. 3, the first XR device 304 and the second XR device 308 are communicatively coupled to each other to enable data sharing. For example, the first XR device 304 may use the communication component 208 to establish a wireless link with the second XR device 308 for data sharing. The first XR device 304 can, in some examples, access 6 DOF poses of the second XR device 308 via the wireless link to track a pose trajectory of the second XR device 308 while the wearer 306 is moving (relative to the first XR device 304). In some examples, the first XR device 304 and/or the second XR device 308 may be connected to a server, e.g., the server 112. It is noted that certain functions in examples herein as being performed at an XR device may, in other examples, be performed at a server.

As mentioned, spatial and temporal alignment may be required in order to ensure a seamless or collaborative AR experience. FIG. 3 shows that the first XR device 304 may perform ego-motion alignment, which involves determining an alignment transformation 316 to align a local coordinate system of the first XR device 304 with a local coordinate system of the second XR device 308. FIG. 3 further shows that time synchronization 318 may be performed. The first XR device 304 may use the shared experience system 224 for alignment operations.

In some examples, AR experiences are designed to operate in devices that have their poses expressed in the same coordinate system and time-stamped from the same (or an aligned) clock. Ego-motion alignment can be performed to align the local coordinate systems and establish a shared coordinate system.

When performing ego-motion alignment, one XR device may be a "host" with one or more "clients" connecting to the host. For example, the first XR device 304 may be the host, with the first XR device 304 determining a transformation required to align the local coordinate system of the second XR device 308 with that of the first XR device 304.

In some examples, the first XR device 304 and the second XR device 308 may scan a common marker or anchor point as part of ego-motion alignment. In such cases, both the first XR device 304 and the second XR device 308 may recognize a reference or anchor point in the real-world environment (e.g., via a camera and/or other sensor) and align their respective coordinate systems to the reference point. The reference or anchor point may define a point in a global or reference coordinate system. However, this option is not always desirable or feasible. For example, where the wearer 302 is facing the wearer 306, there is often limited overlapping scene area useful for scanning of a common point. Further, the common point may be observed from significantly different vantage points, increasing the risk of failure when this technique is used.

In other examples, where both the first XR device 304 and the second XR device 308 use a mapping system, such as a SLAM system, in the same real-world environment, they can share and align their maps to create the common or shared coordinate system. However, this option is also not always desirable or feasible. For example, privacy issues may arise when sharing such maps with metadata, such as image point descriptors. Further, running a full mapping service and sharing maps in this manner may be computationally expensive, consume significant memory, or result in poor battery life.

Another option for ego-motion alignment involves tracking, by one XR device, a visual feature (or multiple visual features) of the wearer of the other XR device. This option can be referred to as user-in-the-loop ego-motion alignment.

At a high level, the goal of user-in-the-loop ego-motion alignment may be to solve for an unknown transformation into a common or shared coordinate system. An XR device may know the 6 DOF poses of the other XR device and capture observations to track the visual feature of the wearer of the other XR device. It has been shown that, by knowing the 6 DOF pose trajectory of the other XR device and also tracking the visual feature, the unknown transformation is solvable. Examples of user-in-the-loop ego-motion alignment are provided below, with reference to FIG. 3.

The first XR device 304 and the second XR device 308 can perform user-in-the-loop ego-motion alignment to align their spatial reference systems. Ego-motion alignment may be performed as follows. Each XR device 304, 308 receives the pose of the other XR device and also captures images of the other user, e.g., the first XR device 304 tracks the face of the wearer 306 and the second XR device 308 tracks the face of the wearer 302.

In the case of the first XR device 304, a minimum requirement may be that the first XR device 304 observes the face of the wearer 306 and receives pose data from the second XR device 308. In other words, the second XR device 308 need not necessarily have to observe the face of the wearer 302 and the first XR device 304 need to not necessarily have to share its pose with the second XR device 308 for the first XR device 304 to perform ego-motion alignment. Still referring to the case of the first XR device 304, the tracked pose of the second XR device 308 provides a pose trajectory of the second XR device 308 and, together with the captured observations that provide corresponding positions of the wearer 306 (e.g., an estimated trajectory based on visual observations), it is possible to determine the alignment transformation that is required to align the pose trajectory of the first XR device 304 with the pose trajectory of the second XR device 308, and thus the two different coordinate systems. For example, the alignment transformation may be a transformation that transforms the local coordinate system of the second XR device 308 to match the local coordinate system of the first XR device 304, in which case the common or shared virtual content may be the local coordinate system of the first XR device 304.

Different methods may be used to observe and track the visual feature on the other wearer. For example, the first XR device 304 (or each XR device 304, 308) may run a face detector (e.g., as part of the object tracking system 222) that tracks the face of the other wearer. The face detector may utilize a suitable computer vision algorithm, such as one or more neural networks, or an eigen face technique, to detect the face. Each XR device 304, 308 may also run an ego-pose tracker, such as a VIO pose tracker, a SLAM system, or both, and the pose trackers of the XR devices 304, 308 may be gravity aligned. Gravitational alignment may be determined by the inertial sensor 214 (e.g., IMU). This means that one of their coordinate axes (e.g., the z-coordinate) is oriented towards the earth's center. Remaining rotational ambiguity to be estimated may thus be one-dimensional, meaning that only one angle is needed to be estimated for the orientation part of the alignment transformation. For the translation part, three values (x, y, z), thus four in total, need to be estimated. Processing may be performed at one of the first XR device 304, the second XR device 308, or a server, e.g., the server 112.

In some examples, the first XR device 304 (or each XR device 304, 308) may run the face detector and track a fixed point on a symmetry plane of the face of the other user, and its (x, y) coordinates in each captured image or frame is output and processed. This may, for example, be a point on the nose. In this case, there may be an additional unknown, being a distance of the inertial sensor 214 to the fixed point, e.g., the distance from the nose of the wearer 306 to the IMU of the second XR device 308. The (x, y) coordinates together with the shared pose data make the alignment problem solvable.

In other examples, the first XR device 304 (or each XR device 304, 308) uses face detection to generate a bounding box of the face of the observed wearer in the captured images and to initialize an XR device tracker. A full 3D model of the XR device may be known and stored in memory of the XR device. In such cases, the first XR device 304, for example, may track a fixed point on the second XR device 308 itself (e.g., (x, y) coordinates thereof), instead of a point on the face of the wearer 306. Accordingly, the "visual feature of the wearer" may include a feature of the XR device being worn by the wearer. This eliminates the additional unknown mentioned above. However, in both cases the alignment problem may be solvable by capturing images and tracking the position of the fixed point over time, together with the gravity-aligned poses.

A processor (e.g., the processor 204) may use the pose data and tracked (x, y) coordinates to build matrices to arrive at a Quadratic Eigenvalue Problem (QEP). The processor may implement a suitable solver for determining the relevant alignment transformation, e.g., to determine 4 points (in the case of face feature tracking) or 3 points (in the case of XR device tracking). The output may be a yaw-angle difference and a 3D translation of the alignment transformation.

Approaches to user-in-the-loop ego motion alignment are described, for example, by B. Micusik et al. in "Ego-Motion Alignment from Face Detections for Collaborative Augmented Reality," arXiv: 2010.02153v1, which is incorporated herein by reference in its entirety, and in U.S. Pat. No. 11,587,255 B1, which is incorporated herein by reference in its entirety.

As mentioned, an ego-motion alignment algorithm or solver may rely on accurate time synchronization, e.g., an ego-motion alignment solver may calculate an alignment transformation based on the assumption that two XR devices are time synchronized. Accordingly, while user-in-the-loop ego-motion alignment can be effective, it requires accurate timestamps between devices, e.g., less than about 30 ms of actual time offset.

If the time offset is significant, e.g., 100 ms, 200 ms, or 300 ms, ego-motion alignment errors may creep in, possibly resulting in a poor quality shared experience. For example, the wearer 302 of the first XR device 304 may place a virtual object on a real-world table, but due to poor alignment, the wearer 306 of the second XR device 308 sees the virtual object "floating" in mid-air. As another example, the wearer 302 of the first XR device 304 may point to a virtual object currently being shown to the wearer 302 so as to draw the attention of the wearer 306 of the second XR device 308 to the virtual object, but due to timing issues the wearer 306 does not see the virtual object at the time when the wearer 302 is making the pointing gesture.

As mentioned, the clocks of the first XR device 304 and the second XR device 308 could be synchronized by an external source in some cases, e.g., using NTP. However, for at least the reasons set out above, it may be desirable to leverage other techniques for time synchronization. Examples of image-based and audio-based time synchronization techniques that leverage user-in-the-loop are described with reference to FIGS. 4 to 10 below.

Figure 4:
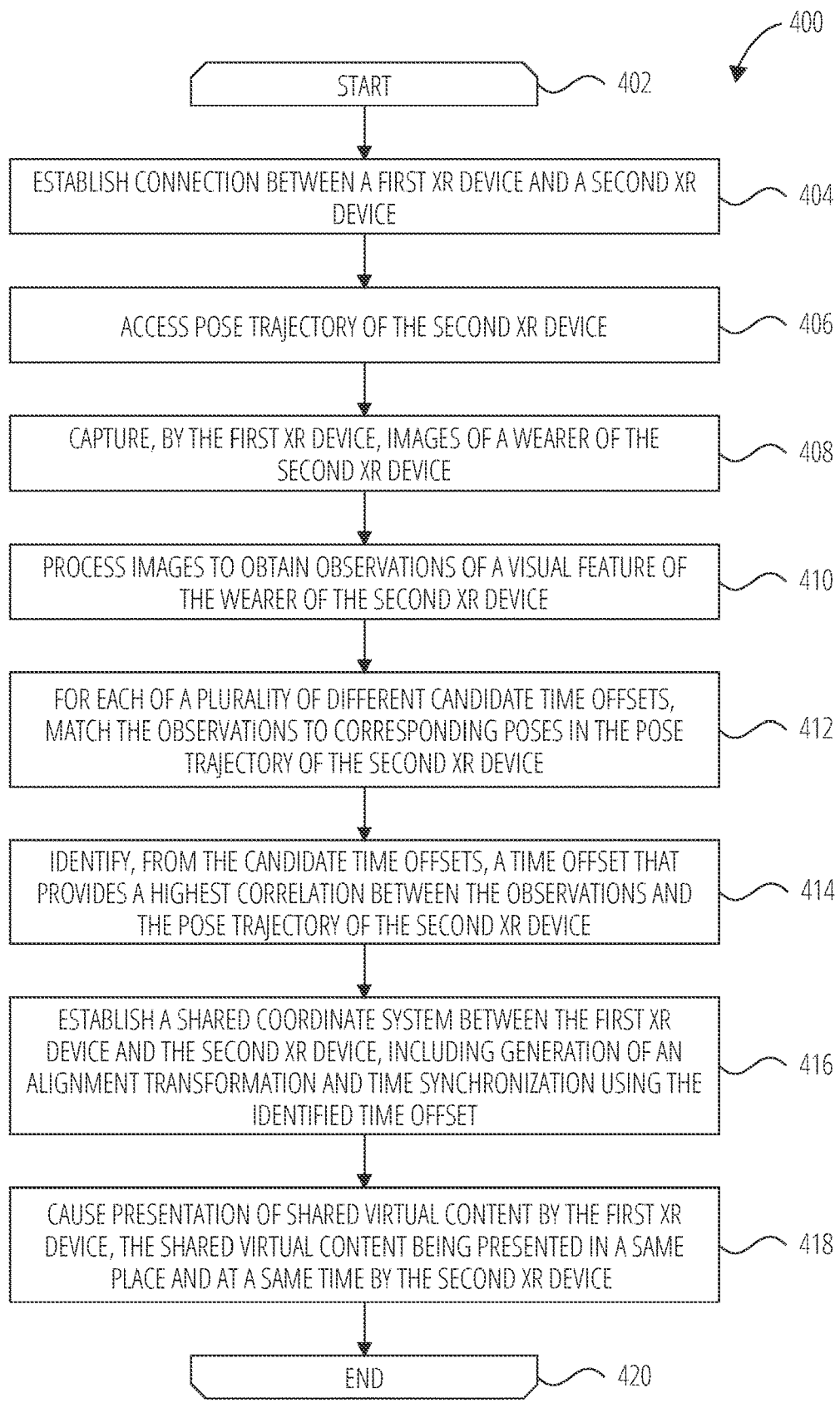
FIG. 4 is a flowchart illustrating a method suitable for establishing a shared coordinate system between a first XR device and a second XR device, including synchronization of clocks of the first XR device and the second XR device, according to some examples.

FIG. 4 illustrates a method 400 suitable for establishing a shared coordinate system between a first XR device and a second XR device, according to some examples. Operations in the method 400 may be performed by or using components (e.g., parts, modules, systems, or engines) described above. Accordingly, by way of example and not limitation, the method 400 is described with reference to the first XR device 304 and the second XR device 308 of FIG. 3, as well as components illustrated in FIG. 2. However, it shall be appreciated that at least some of the operations of the method 400 may be deployed on various other hardware configurations or be performed by similar components residing elsewhere.

The method 400 commences at opening loop element 402 and proceeds to operation 404, where the first XR device 304 establishes a connection with the second XR device 308. As mentioned, the communication component 208 can be used to establish a wireless link between the first XR device 304 and the second XR device 308.

The connection enables the first XR device 304 to access pose data of the second XR device 308. This may include a pose trajectory of the second XR device 308, as provided at operation 406. The pose trajectory may be a sequence or series of pose values recorded or measured over time, capturing the pose of the second XR device 308 according to the local coordinate system of the second XR device 308. For example, the second XR device 308 may stream its pose to the first XR device 304 in real time. Alternatively, the second XR device 308 may stream its pose to a server accessible to the first XR device 304.

Figure 5:
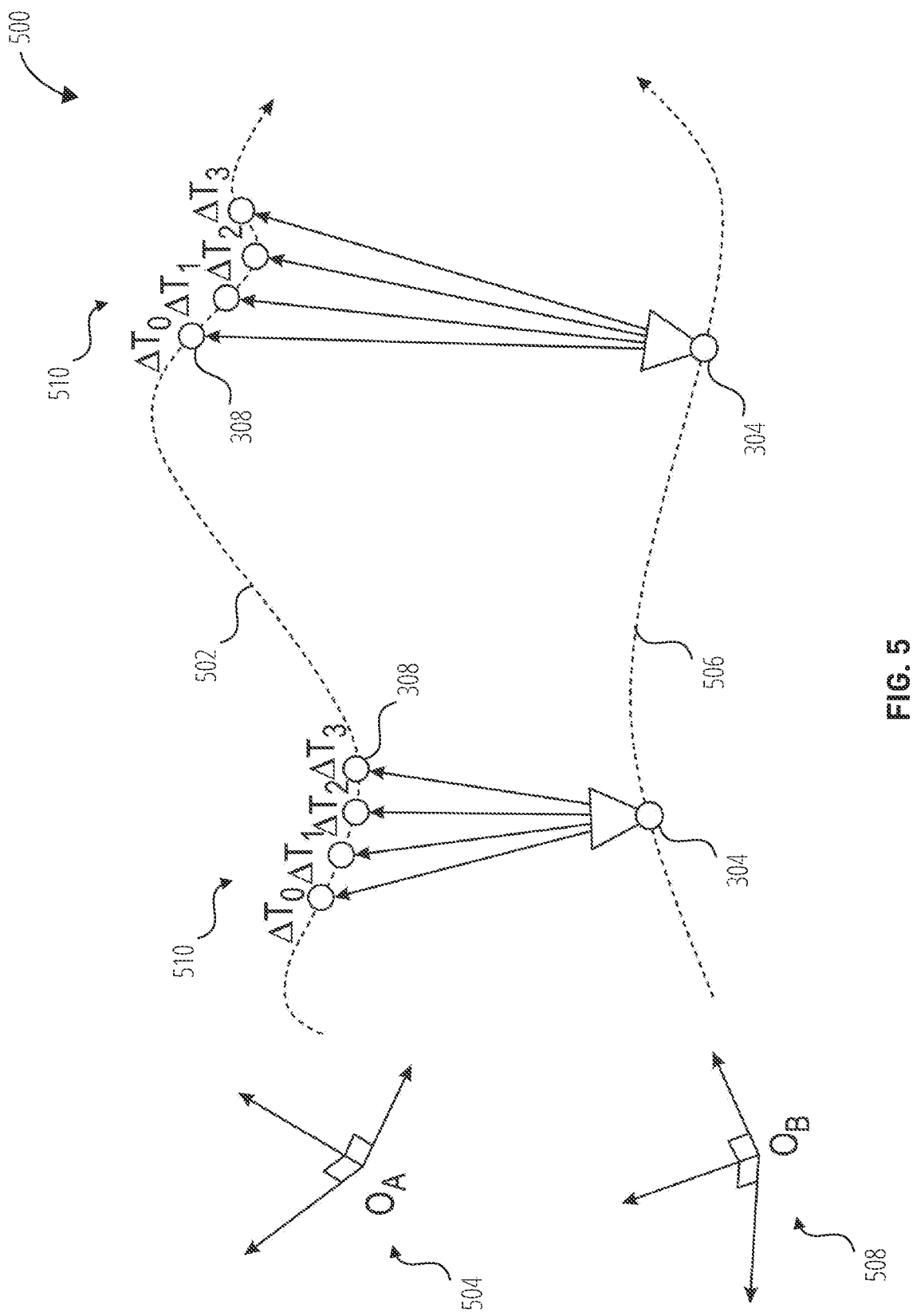
FIG. 5 diagrammatically illustrates pose trajectories of a first XR device and a second XR device, respectively, according to some examples.

FIG. 5 is a diagram 500 that provides an illustration of a pose trajectory 502 of the second XR device 308, according to some examples. It is noted that the pose trajectory 502 is depicted in 2D merely to facilitate understanding of aspects described herein, and that the pose trajectory 502 may, for example, be a 3D or 6 DOF pose trajectory in which each pose includes 3 or 6 values associated with a particular timestamp. The pose trajectory 502 has an origin 504 (marked $O_A$ in FIG. 5) in the local coordinate system of the second XR device 308.

FIG. 5 also shows a pose trajectory 506 of the first XR device 304, according to some examples. Similarly, the pose trajectory 506 is shown in 2D merely to facilitate understanding of aspects described herein. The pose trajectory 506 has an origin 508 (marked $O_B$ Bin FIG. 5) in the local coordinate system of the first XR device 304.

The pose trajectory 502 may be provided by timestamped poses generated by the object tracking system 222 of the second XR device 308, e.g., using a SLAM or VIO system. Similarly, the pose trajectory 506 may be provided by timestamped poses generated by the object tracking system 222 of the first XR device 304, e.g., using a SLAM or VIO system.

Ego-motion alignment may be performed to align the respective local coordinate systems of the first XR device 304 and the second XR device 308. However, it is desirable to accurately determine the time offset between a first clock of the first XR device 304 and a second clock of the second XR device 308 to improve such ego-motion alignment, as described below.

In the method 400 of FIG. 4, to enable the first XR device 304 to determine the time offset, relative motion between the first XR device 304 and the second XR device 308 may be needed. In some examples, the AR application 226 running on the first XR device 304 and/or the second XR device 308 prompts its wearer 302, 306 to move as part of initializing a shared experience. However, in other examples, natural relative motion may be leveraged without explicitly prompting a wearer to move. It is noted that it may not be required for both the first XR device 304 and the second XR device 308 to move, as long as there is relative movement between them and sufficient observations can be obtained. For example, at least four independent observations from different relative locations may be needed to provide an ego-motion alignment solution. However, it is noted that, in other examples, it may be possible to obtain sufficient observations without requiring such relative motion.

Referring again to FIG. 4, at operation 408, the first XR device 304 captures images of the wearer 306 of the second XR device 308. The first XR device 304 may use one or more cameras to capture a video stream of the wearer 306, with the first XR device 304 sampling images from the video stream to obtain the observations referred to below. In the method 400, to enable the first XR device 304 to capture the wearer 306, e.g., the face of the wearer 306, the first XR device 304 may prompt the wearer 302 to look at the other wearer 306 as part of initializing the shared experience. For example, this may ensure that the first XR device 304 can run its face tracker to identify the face of the wearer 306 and then track relevant visual features, as described below.

As mentioned above, the images may allow the first XR device 304 to obtain observations of a visual feature (or multiple features), such as the nose of the wearer 306 or a landmark point on the second XR device 308. The first XR device 304 may execute a suitable tracker, e.g., a face tracker, to detect the face and then obtain the required observations. The images are captured at different points in time and processed to provide a set of time-indexed positions of the visual feature (operation 410).

For example, the images may be processed to identify and track the (x, y) position of the visual feature as it changes over time. In some cases, the position is a position of the visual feature, e.g., the nose, as located on a symmetry plane of the facial region of the wearer 306.

Given that the images are captured by the first XR device 304, these time-indexed positions are timestamped according to the first clock of the first XR device 304. Further, given that the pose trajectory 502 is generated by the second XR device 308, the poses in the pose trajectory 502 are timestamped according to the second clock of the second XR device 308.

In some examples, the time-indexed positions are used by the first XR device 304 to generate an estimated trajectory of the second XR device 308. The estimated trajectory is image-based, e.g., based on the observations of the wearer 306 captured using the image sensors 212 of the first XR device 304, while the pose trajectory 502 is ego-pose tracker-based and shared with the first XR device 304 from the second XR device 308.

The first XR device 304 may then determine the time offset between the first clock of the first XR device 304 and the second clock of the second XR device 308. At a high level, in some examples, the time offset is determined by globally matching the observations captured by the first XR device 304 to the poses (e.g., 6 DOF poses) of the second XR device 308 using different possible (e.g., candidate) time offsets, and identifying one of the possible time offsets as providing the best or most promising solution to the ego-motion alignment problem.

In the method 400 of FIG. 4, a plurality of different candidate time offsets 510 are selected and simulated, as illustrated in FIG. 5, to determine which of the candidate time offsets provides the best match between the estimated trajectory (that is based on the image observations) and the pose trajectory 502. It will be evident from FIG. 5 that each candidate time offset 510 artificially "shifts" the pose of the second XR device 308 in the pose trajectory 502 relative to the pose trajectory 506 of the first XR device 304. In other words, the method 400 may involve simulating multiple trajectories at different start times.

In some examples, two assumptions may be utilized to ensure that the technique converges to a solution. The first assumption may be that trajectories are rigid, and the second assumption may be that time is constant (e.g., no clock drift). This may allow for regarding an on-device measured trajectory (e.g., VIO/SLAM based) and a visually observed trajectory (observed from the other device) as two respective signals to be aligned with each other. By globally offsetting time (e.g., shifting the measured trajectory in time), it is possible to preserve features that allow for aligning of these signals.

At operation 412, for each of the candidate time offsets 510, the first XR device 304 matches the image-based observations of the visual feature with corresponding poses in the pose trajectory 502 of the second XR device 308 (which correspond specifically for the given time offset). The first XR device 304 then identifies (operation 414) which one of the candidate time offsets 510 provides the highest correlation between the image-based observations and the pose trajectory 502 of the second XR device 308. In the method 400 of FIG. 4, the first XR device 304 performs or simulates user-in-the-loop ego-motion alignment for each of the candidate time offsets 510, and in each case assumes that the particular candidate time offset is the actual "time delta" between the first XR device 304 and the second XR device 308 (as opposed to assuming that the clocks of first XR device 304 and the second XR device 308 are already synchronized when performing user-in-the-loop ego-motion alignment).

In some examples, in each simulation, the first XR device 304 uses the given candidate time offset as the "actual" time offset for purposes of the simulation and generates an alignment transformation that is valid for that candidate time offset. For example, a first candidate time offset may be 1 second and a second candidate time offset may be 0.8 seconds. The first XR device 304 uses 1 second as the time offset between the first clock and the second clock, matches observations to time-corresponding poses of the second XR device 308 based on the 1-second time offset, and calculates a first alignment transformation using user-in-the-loop ego-motion alignment. The first XR device 304 does the same for the 0.8-second time offset and calculates a second alignment transformation. The first XR device 304 proceeds with this process and then compares the results to find an optimal or near-optimal solution that indicates the actual time offset between the origin 504 and the origin 508.

For example, the first XR device 304 may run a simulation for different candidate time offsets, using a grid-search type approach to converge to an optimal or near-optimal solution. For example, as part of the grid-search, the first XR device 304 may simulate 0, 0.25, 0.5, 1, 1.5, and 2 second time offsets, respectively. Then, the first XR device 304 performs a second run with a finer grid around the best solution, e.g., 0.125 and 0.375 seconds, if 0.25 was the best solution in the first run. This process may continue until an optimal or satisfactory solution is found. The XR device 304 may utilize heuristics to determine whether to accept a solution or not. If a solution is not accepted, the XR device 304 may wait for more observations to be obtained and retry the search to find a new solution (that may or may not be accepted). The heuristics may include, for example: the grid has a distinct peak, the error is below a certain threshold, or enough inliers (e.g., observations that support the solution) are present.

A processor, e.g., the processor 204, of the first XR device 304 may implement a solver that executes to converge to the solution. The simulation performs matching globally, which means that it uses all poses in a given pose trajectory and all image-based observations offset relative to the given pose trajectory by the relevant candidate time offset.

In some examples, the degree of correlation or alignment between the image-based observations and the pose trajectory for a given time offset (e.g., how well the observations "fit" the pose trajectory) is used to provide a "solution score." If the given time offset provides a high degree of correlation, the solution score is higher than for another time offset that provides a lower degree of correlation. Solution scores may, for example, be normalized such that a score of 1 is indicative of the highest possible correlation (see FIG. 6, which is described below).

Figure 6:
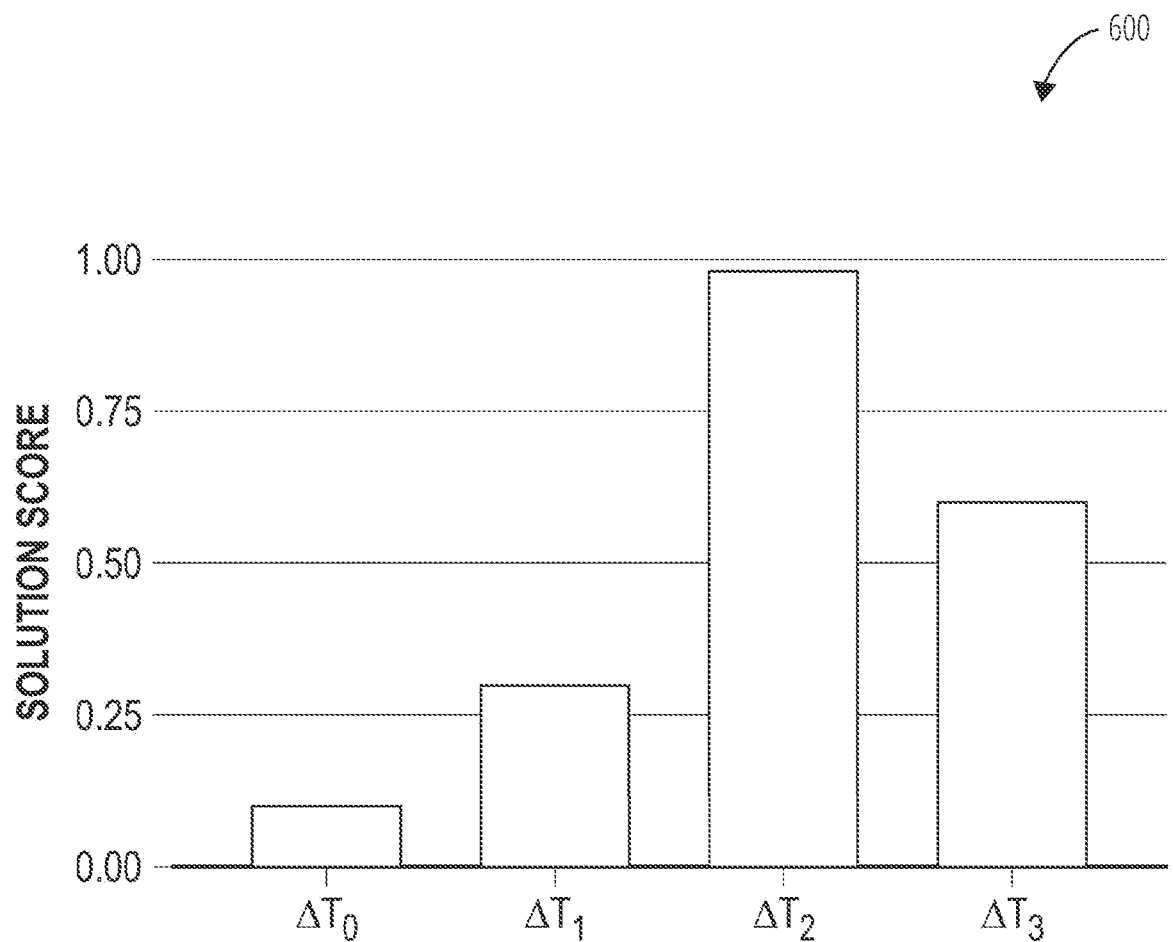
FIG. 6 is a graph illustrating solution scores generated for different candidate time offsets associated with pose trajectories of a first XR device and a second XR device, according to some examples.

In some examples, to obtain a solution score, an inlier metric may be used. The inlier metric may saturate with a low and high threshold, e.g., the value is 0 if there are too few inliers present, and the value is 1 if sufficient inliers are present. In some examples, observations that were not used for calculating the solution may be used as the inliers to ensure a low reprojection error. Accordingly, the solution score is high if there is a strong correlation between observations and the solution, and low if this is not the case. FIG. 6 is a graph 600 illustrating solution scores generated for each of the candidate time offsets 510, according to some examples. In this example, one of the candidate time offsets 510, time offset $T_2$, is shown to provide the highest correlation between the observations and the pose trajectory 502 when that particular candidate time offset is applied to align the pose trajectory 502 with the pose trajectory 506 using user-in-the-loop ego-motion alignment.

In some examples, and referring again to FIG. 4, the first XR device 304 therefore identifies one of the candidate time offsets 510 (operation 414) and selects it for use in establishing the shared coordinate system and providing the shared experience between the first XR device 304 and the second XR device 308. The selected time offset may be the time offset that provides the highest correlation, as mentioned above, and which therefore minimizes a pose trajectory alignment error. In this context, the "alignment error" may refer to how well observed (x, y) positions correspond to the actual positions. For example, a large number of observations, e.g., 100 or 1000, may be obtained, and 4 observations are selected to compute a candidate solution. With this candidate solution, it is possible to compute the reprojection error of all other observations, e.g., the landmark (observed position) is projected to the other device's local coordinate system and compared to the measured/tracked position according to the ego-motion tracker pose. The "alignment error" may provide an indication of the extent of reprojection errors.

In this way, synchronization can be performed by leveraging user-in-the-loop, e.g., in the case of the first XR device 304, by leveraging sensory data of the wearer 306 of the second XR device 308.

The method 400 proceeds to operation 416 where the shared coordinate system is established. The shared coordinate system can be established by aligning the local coordinate system of the second XR device 308 to that of the first XR device 304 by applying the alignment transformation generated using user-in-the-loop ego-motion alignment with the selected time offset. The first clock and the second clock are synchronized based on the selected time offset such that their poses can be timestamped from synchronized clocks during the shared experience.

At operation 418, the shared virtual content 310 is presented to the wearer 302 of the first XR device 304 and also presented, in substantially the same place and at substantially the same time, to the wearer 306 of the second XR device 308. The method 400 concludes at closing loop element 420.

Figure 7:
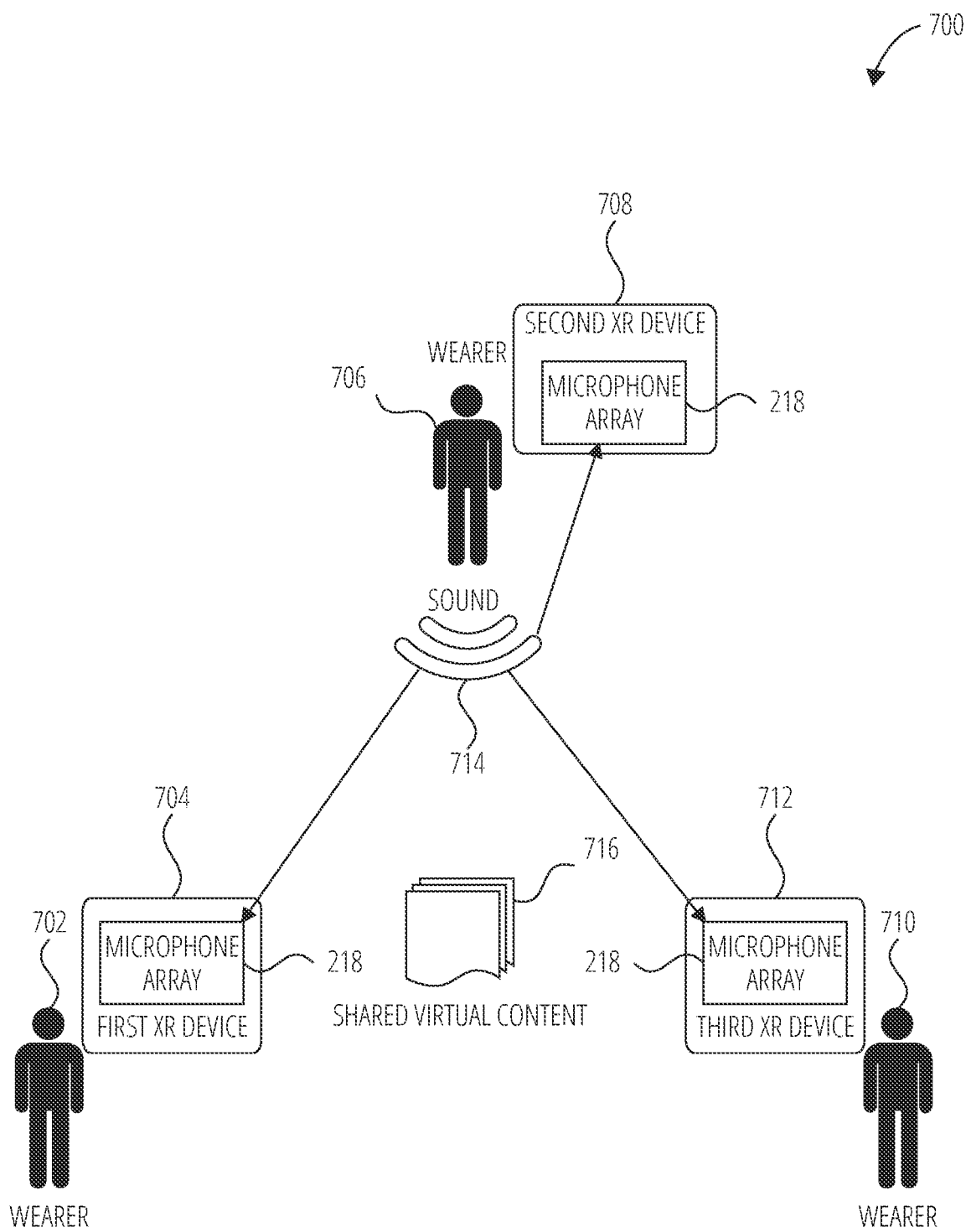
FIG. 7 is a diagram illustrating aspects of audio-based time synchronization for establishing a shared experience, according to some examples.

FIG. 7 is a diagram 700 illustrating aspects of audio-based time synchronization for establishing a shared experience between a wearer 702 of a first XR device 704, a wearer 706 of a second XR device 708, and a wearer 710 of a third XR device 712, according to some examples. In FIG. 7, clock synchronization is performed by using sensory data of the wearer 706 of the second XR device 708 in the example form of sound 714 generated or made by the wearer 706.

In FIG. 7, the first XR device 704, the second XR device 708, and the third XR device 712 may each include one or more components of the XR device 110 described with reference to FIG. 1 and FIG. 2. Accordingly, reference is made below to certain components shown in FIG. 2.

The first XR device 704, the second XR device 708, and the third XR device 712 are colocated in an environment, e.g., in the same room. The shared experience of FIG. 7 is a shared AR experience in which shared virtual content 716 is simultaneously presented to the first XR device 704, the second XR device 708, and the third XR device 712 such that the shared virtual content 716 appears superimposed over the real-world in the same place. The wearers 702, 706, 710 may be able to interact with the shared virtual content 716, e.g., through hand gestures, e.g., as described above.

In FIG. 7, the XR devices 704, 708, 712 are communicatively coupled to each other to enable data sharing, e.g., using the communication component 208 as described with reference to FIG. 2. Data sharing may include the sharing of audio signals, as described below, as well as the sharing of tracking information, such as 6 DOF poses to facilitate ego-motion alignment.

As mentioned, when performing ego-motion alignment, one XR device may be a host with one or more clients connecting to the host. In the case of FIG. 7, the second XR device 708 is designated as the host, with the wearer 706 of the second XR device 708 generating the sound 714 to allow the other XR devices 704, 712 to connect or synchronize to the second XR device 708 as clients or "joiners." Further, and as explained above, a transformation may be determined to align the respective local coordinate systems of the first XR device 704 and the third XR device 712 with that of the second XR device 708 to provide the shared experience.

The wearer 706 of the second XR device 708 generates or makes the sound 714, e.g., by saying a predefined word or by playing a predefined computer-generated tone. The first XR device 704, the second XR device 708, and the third XR device 712 each include the microphone array 218 of FIG. 2 and use the microphone array 218 to capture the sound 714.

Each XR device 704, 708, 712 captures the sound 714, and the shared experience system 224 of each XR device 704, 708, 712 generates a time-indexed audio signal that represents the sound 714. Each XR device 704, 708, 712 time-indexes the audio signal according to its own on-board clock.

The time-indexed audio signals can then be analyzed to determine the time offset between respective pairs of the XR devices 704, 708, 712. The time-indexed audio signals may be analyzed at one or more of the XR devices 704, 708, 712, or at a server that is communicatively coupled to the XR devices 704, 708, 712, e.g., similar to the server 112 of FIG. 1.

In the case of FIG. 7, the second XR device 708, acting as the host, captures its own time-indexed audio signal using its microphone array 218, and also receives respective time-indexed audio signals from the first XR device 704 and the third XR device 712. The second XR device 708 then uses the shared experience system 224 to compare its own time-indexed audio signal with that of the first XR device 704 to determine the time offset between the clocks of the first XR device 704 and the second XR device 708, and also compares its own time-indexed audio signal with that of the third XR device 712 to determine the time offset between the clocks of the third XR device 712 and the second XR device 708.

Audio signals can be compared using a cross-correlation coefficient to determine the relevant time offset, as described with reference to FIG. 10 below. Furthermore, the second XR device 708 may use the object tracking system 222 to estimate and account for the distance between the second XR device 708 and each other XR device 704, 712 and adjust the relevant time offset accordingly, as is described with reference to FIG. 8 below.

The identified time offsets can then be used to ensure that the XR devices 704, 708, 712 are all synchronized as part of establishing a shared coordinate system. Once the shared coordinate system is established, the shared virtual content 716 can be presented to the wearers 702, 706, 710 in a substantially seamless manner.

Figure 8:
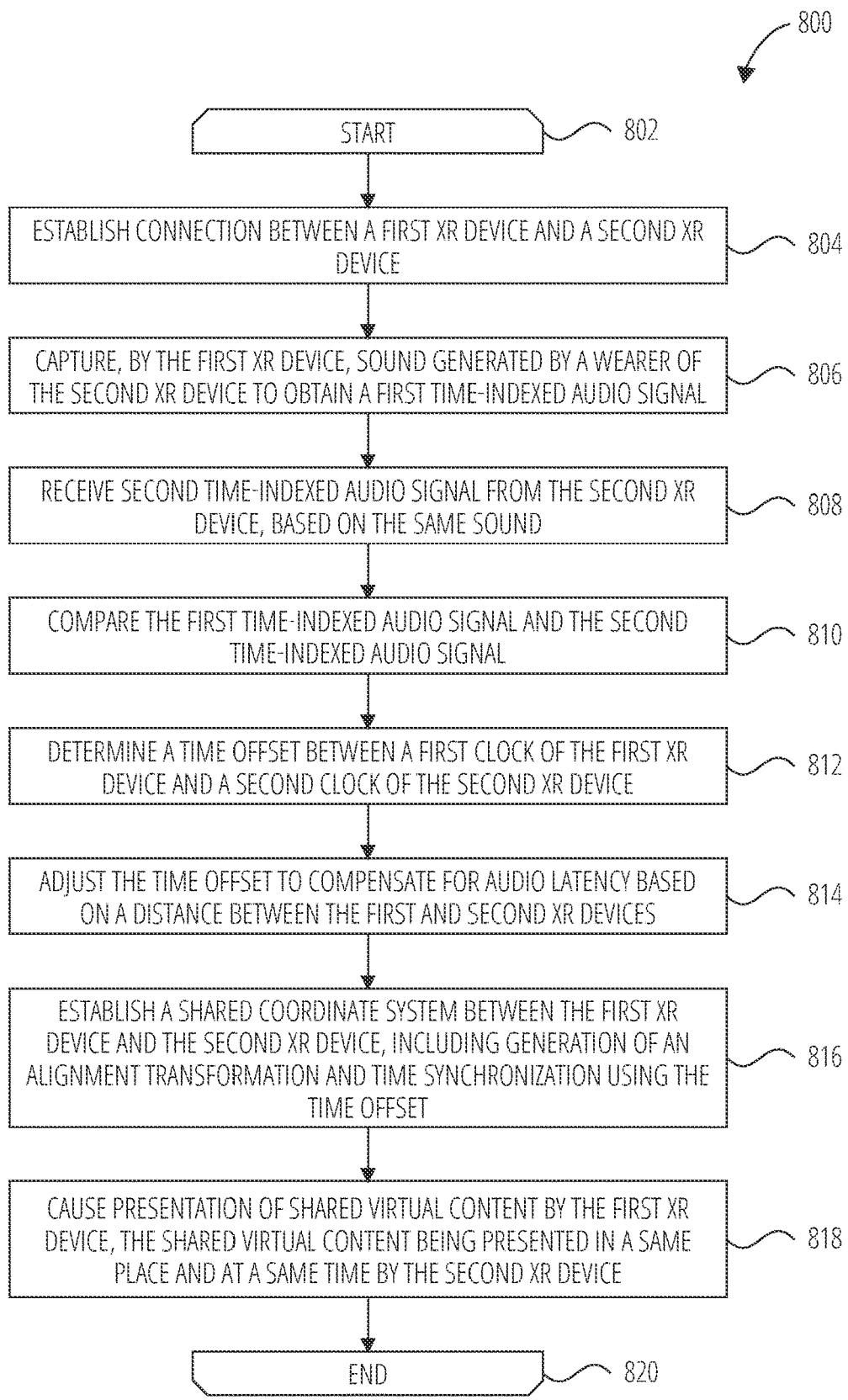
FIG. 8 is a flowchart illustrating a method suitable for establishing a shared coordinate system, including synchronization of the clocks of a first XR device and a second XR device, according to some examples.

FIG. 8 illustrates a method 800 suitable for establishing a shared coordinate system between a first XR device and a second XR device, according to some examples. Operations in the method 800 may be performed by or using components (e.g., parts, modules, systems, or engines) described above. Accordingly, by way of example and not limitation, the method 800 is described with reference to the first XR device 704 and the second XR device 708 of FIG. 7, as well as components illustrated in FIG. 2. However, it shall be appreciated that at least some of the operations of the method 800 may be deployed on various other hardware configurations or be performed by similar components residing elsewhere.

The method 800 commences at opening loop element 802 and proceeds to operation 804, where the first XR device 704 establishes a connection with the second XR device 708. The communication component 208 shown in FIG. 2 may be used to establish a wireless link between the first XR device 704 and the second XR device 708.

The connection enables the first XR device 704 to access a pose trajectory of the second XR device 708, as described elsewhere herein. Further, the first XR device 704 may capture images of the wearer 706 of the second XR device 708 and use the images together with the pose trajectory of the second XR device 708 to perform user-in-the-loop ego-motion alignment. In the method 800 of FIG. 8, the first XR device 704 and the second XR device 708 perform audio-based time synchronization to align their respective clocks and thereby to improve or facilitate ego-motion alignment. Accordingly, audio-related data is also shared via the connection.

To facilitate understanding of certain aspects described herein, the operations in FIG. 8 only refer to the first XR device 704 and the second XR device 708, and not to the third XR device 712. However, it will be appreciated that similar operations may be performed to align and/or synchronize more than two devices.

At operation 806, the first XR device 704 captures the sound 714 generated by the second XR device 708. In some examples, the AR application 226 executing on the second XR device 708 may prompt the wearer 706 to make a predetermined sound or to play a predetermined tone. In other examples, the AR application 226 may automatically cause the sound 714 to be played via the second XR device 708 or another connected device of the wearer 706.

The first XR device 704 listens for the predetermined sound 714. Once recorded, the audio signal may be processed to extract significant information, e.g., to isolate the sound 714 from noise or other audio, or to reduce data size. The first XR device 704 generates, based on the sound 714, a first time-indexed audio signal that represents the sound from the temporal perspective of the first XR device 704.

At operation 808, the first XR device 704 receives, from the second XR device 708, a second time-indexed audio signal that was generated by the second XR device 708 based on the same sound 714. The second time-indexed audio signal represents the same sound, but from the temporal perspective of the second XR device 708. In other words, the first time-indexed audio signal may be indexed or timestamped based on a first clock of the first XR device 704 and the second time-indexed audio signal may be indexed or timestamped based on a second clock of the second XR device 708. This allows for a comparison of the signals to determine or estimate a discrepancy between the clocks.

Figure 9:
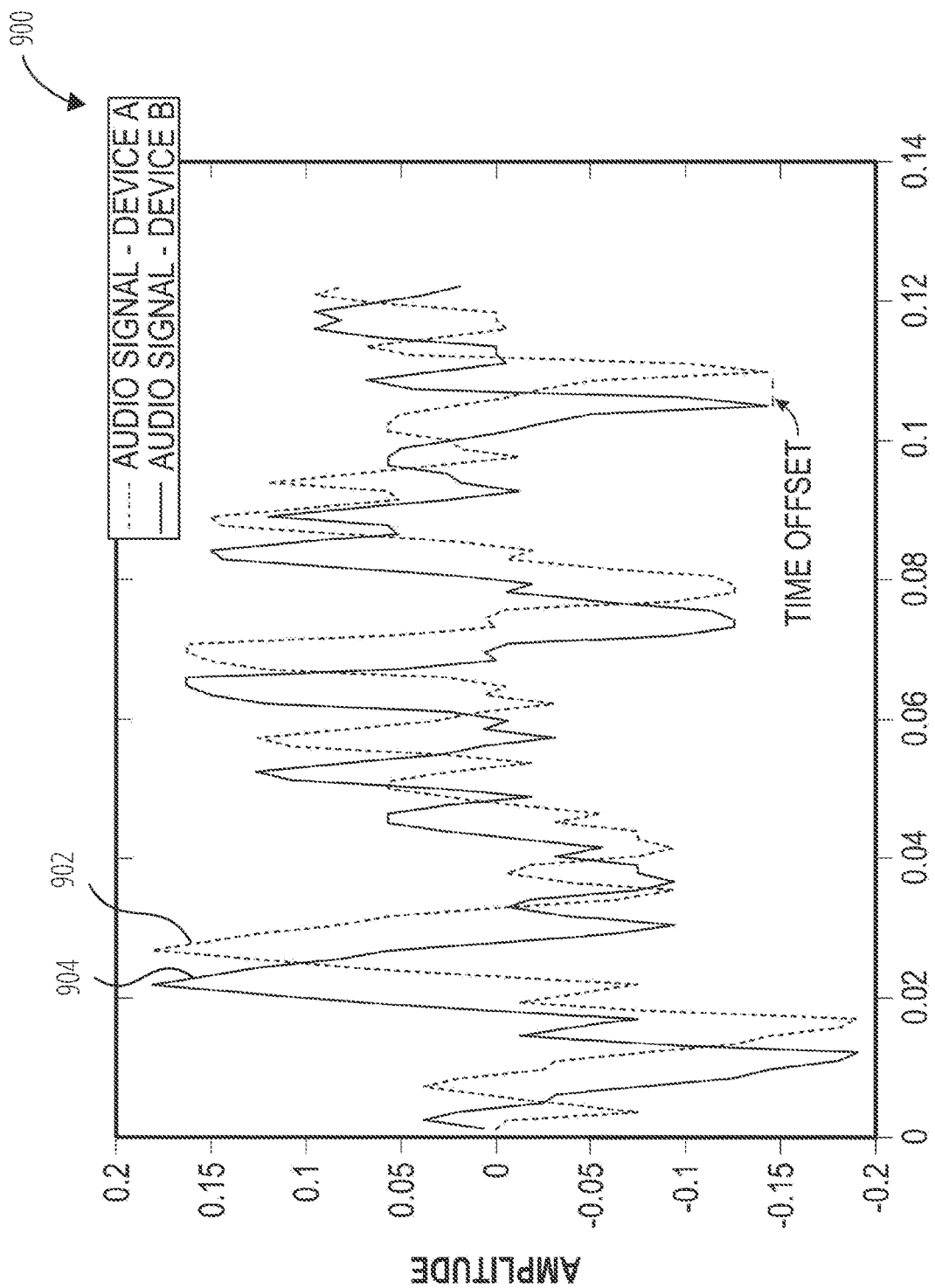
FIG. 9 is a graph illustrating a time offset between a first time-indexed audio signal captured by a first XR device and a second time-indexed audio signal captured by a second XR device, according to some examples.

FIG. 9 shows a graph 900 illustrating the first time-indexed audio signal 902 and the second time-indexed audio signal 904, according to some examples. It will be evident from FIG. 9 that there is a lag between the first time-indexed audio signal 902 and the second time-indexed audio signal 904. Referring to FIG. 8 and FIG. 9, at operation 810, the first XR device 704 compares the first time-indexed audio signal 902 and the second time-indexed audio signal 904 and then determines the time offset (marked "TIME OFFSET" in FIG. 9) at operation 812.

Still referring to FIG. 8, it is noted that while sound has a relatively high temporal resolution, it travels relatively slowly (compared to, for example, light) across an environment, e.g., a room. The time offset may thus be adjusted to compensate for audio latency caused by the distance between the first XR device 704 and the second XR device 708 (operation 814). For example, the first XR device 704 and the second XR device 708 may be 5 meters, 10 meters, or 15 meters apart, and the first XR device 704 can make adjustments to compensate for the "traveling delay" if this distance can be determined or estimated.

In some examples, the microphone array 218 of the first XR device 704 is used to localize the sound 714. As described with reference to FIG. 2 above, the microphone array 218 can be used in SSL to obtain directional information, and the directional information may be combined with other sensor data, e.g., IMU data from the inertial sensor 214, to estimate a position of the second XR device 708 (and thus the wearer 706) relative to the first XR device 704. This enables the first XR device 704 to calculate the impact of the distance on the time offset, e.g., the portion of an initially determined time offset that is attributable to the distance between the first XR device 704 and the second XR device 708, and then adjust or correct the time offset accordingly.

In other examples, the first XR device 704 may use other sensors, e.g., the image sensor 212, the depth sensor 216, and/or the inertial sensor 214, to estimate the distance between first XR device 704 and the second XR device 708 (e.g., without using SSL), and adjust the time offset based on the estimated distance.

In this way, synchronization can be performed by leveraging user-in-the-loop, e.g., in the case of the first XR device 704, by leveraging audio-related sensory data of the wearer 706 of the second XR device 708.

At operation 816, a shared coordinate system is established between the first XR device 704 and the second XR device 708. This may include using the selected time offset (e.g., the time offset that has been adjusted to account for distance) to synchronize the clocks of the first XR device 704 and the second XR device 708 (e.g., to synchronize their 6 DOF poses), and then performing a user-in-the-loop ego-motion alignment algorithm, as described above, to determine an alignment transformation required to establish the shared or common coordinate system. In other examples, clock synchronization may be coupled with another ego-motion alignment technique, such as map-sharing or marker scanning, as described above.

At operation 818, the shared virtual content 716 is presented to the wearer 702 of the first XR device 704 and also presented, in substantially the same place and at substantially the same time, to the wearer 706 of the second XR device 708. The method 800 concludes at closing loop element 820.

Referring again to the comparison of audio signals, in some examples, the process of comparing a first time-indexed audio signal and a second time-indexed audio signal comprises determining a cross-correlation coefficient and identifying the time offset based on the cross-correlation coefficient. FIG. 10 is a cross-correlation graph 1000 providing a measure of similarity between a first time-indexed audio signal, e.g., captured by a first XR device, and a second time-indexed audio signal, e.g., captured by a second XR device, as a function of time offset, or time lag, according to some examples.

Figure 10:
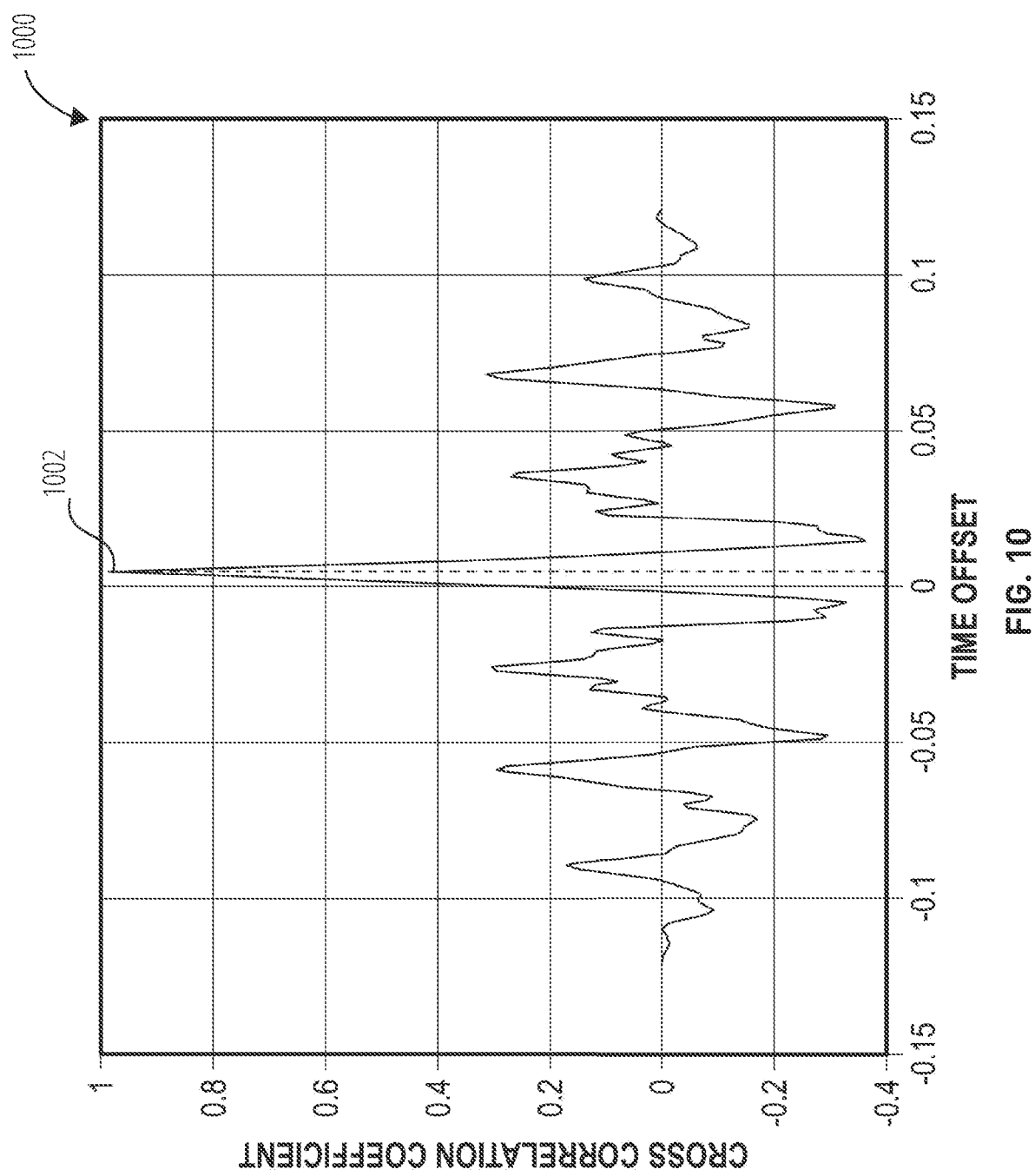
FIG. 10 is a cross-correlation graph providing a measure of similarity between a first time-indexed audio signal captured by a first XR device and a second time-indexed audio signal captured by a second XR device as a function of time offset, or time lag, according to some examples.

In FIG. 10, a peak 1002 can be identified, and the time offset corresponding to the peak 1002 may be designated as the time offset to apply in the clock synchronization or alignment process. In other words, the cross-correlation provides information indicative of a best match, which in turn allows the relevant device or server to infer or estimate the time offset between the clocks of the XR devices.

Figure 11:
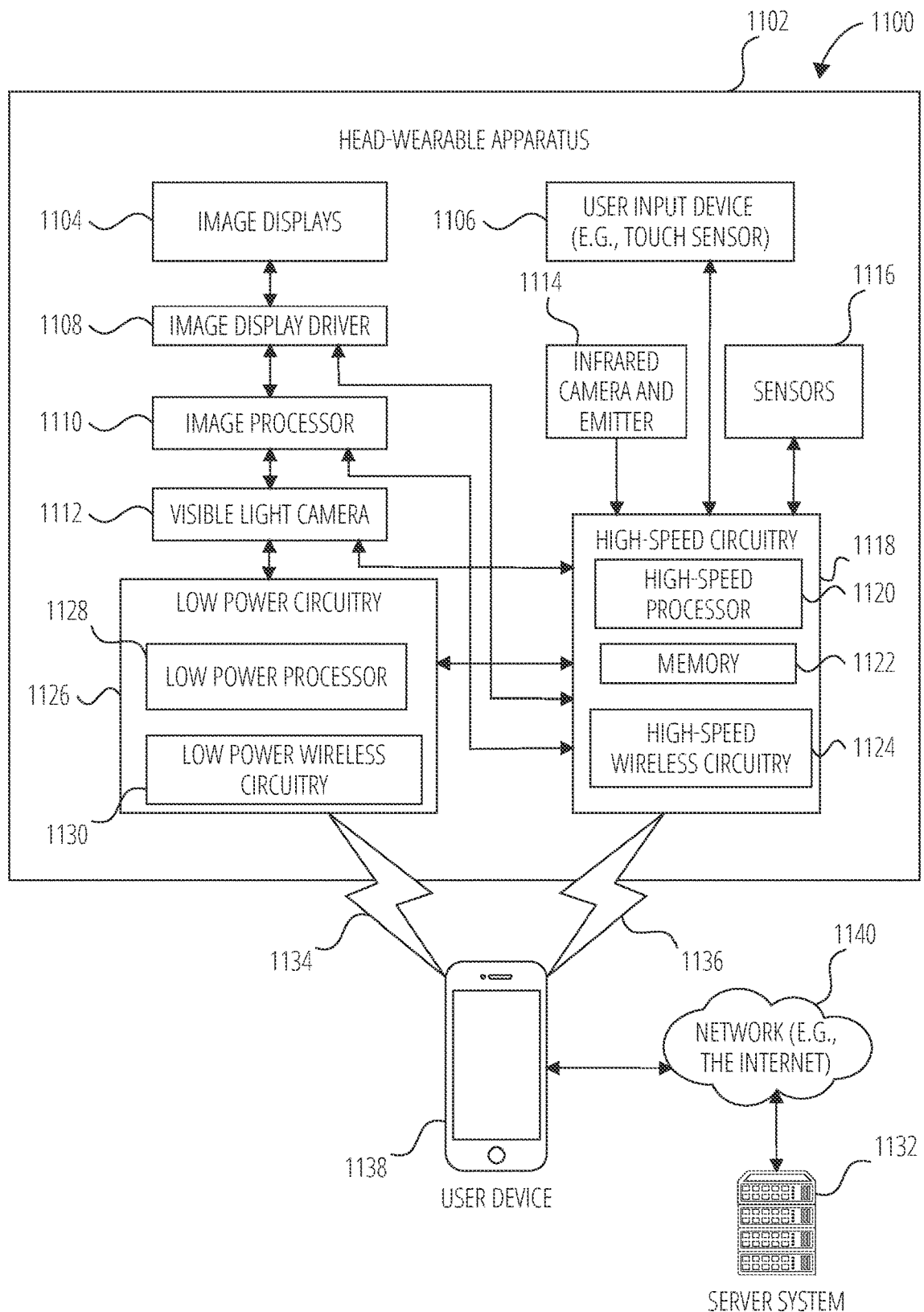
FIG. 11 illustrates a network environment in which a head-wearable apparatus can be implemented, according to some examples.

FIG. 11 illustrates a network environment 1100 in which a head-wearable apparatus 1102, e.g., a head-wearable XR device, can be implemented according to some examples. FIG. 11 provides a high-level functional block diagram of an example head-wearable apparatus 1102 communicatively coupled to a mobile user device 1138 and a server system 1132 via a suitable network 1140. One or more of the techniques described herein may be performed using the head-wearable apparatus 1102 or a network of devices similar to those shown in FIG. 11.

The head-wearable apparatus 1102 includes a camera, such as at least one of a visible light camera 1112 and an infrared camera and emitter 1114. The head-wearable apparatus 1102 includes other sensors 1116, such as motion sensors or eye tracking sensors. The user device 1138 can be capable of connecting with head-wearable apparatus 1102 using both a communication link 1134 and a communication link 1136. The user device 1138 is connected to the server system 1132 via the network 1140. The network 1140 may include any combination of wired and wireless connections.

The head-wearable apparatus 1102 includes a display arrangement that has several components. The arrangement includes two image displays 1104 of an optical assembly. The two displays include one associated with the left lateral side and one associated with the right lateral side of the head-wearable apparatus 1102. In other examples, the head-wearable apparatus 1102 may include a single display. The head-wearable apparatus 1102 also includes an image display driver 1108, an image processor 1110, low power circuitry 1126, and high-speed circuitry 1118. The image displays 1104 are for presenting images and videos, including an image that can provide a graphical user interface (GUI) to a user of the head-wearable apparatus 1102.

The image display driver 1108 commands and controls the image display of each of the image displays 1104. The image display driver 1108 may deliver image data directly to each image display of the image displays 1104 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 1102 may include a frame and stems (or temples) extending from a lateral side of the frame, or another component to facilitate wearing of the head-wearable apparatus 1102 by a user. The head-wearable apparatus 1102 of FIG. 11 further includes a user input device 1106 (e.g., touch sensor or push button) including an input surface on the head-wearable apparatus 1102. The user input device 1106 is configured to receive, from the user, an input selection to manipulate the GUI of the presented image.

The components shown in FIG. 11 for the head-wearable apparatus 1102 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 1102. Left and right sides of the head-wearable apparatus 1102 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1102 includes a memory 1122 which stores instructions to perform a subset or all of the functions described herein. The memory 1122 can also include a storage device. As further shown in FIG. 11, the high-speed circuitry 1118 includes a high-speed processor 1120, the memory 1122, and high-speed wireless circuitry 1124. In FIG. 11, the image display driver 1108 is coupled to the high-speed circuitry 1118 and operated by the high-speed processor 1120 in order to drive the left and right image displays of the image displays 1104. The high-speed processor 1120 may be any processor capable of managing high-speed communications and operation of any general computing system needed for the head-wearable apparatus 1102. The high-speed processor 1120 includes processing resources needed for managing high-speed data transfers over the communication link 1136 to a wireless local area network (WLAN) using high-speed wireless circuitry 1124. In certain examples, the high-speed processor 1120 executes an operating system such as a LINUX operating system or other such operating system of the head-wearable apparatus 1102 and the operating system is stored in memory 1122 for execution. In addition to any other responsibilities, the high-speed processor 1120 executing a software architecture for the head-wearable apparatus 1102 is used to manage data transfers with high-speed wireless circuitry 1124. In certain examples, high-speed wireless circuitry 1124 is configured to implement Institute of Electrical and Electronic Engineers (IEEE) 1102.11 communication standards, also referred to herein as Wi-Fi™. In other examples, other high-speed communications standards may be implemented by high-speed wireless circuitry 1124.

The low power wireless circuitry 1130 and the high-speed wireless circuitry 1124 of the head-wearable apparatus 1102 can include short range transceivers (Bluetooth™) and wireless wide, local, or wide area network transceivers (e.g., cellular or Wi-Fi™). The user device 1138, including the transceivers communicating via the communication link 1134 and communication link 1136, may be implemented using details of the architecture of the head-wearable apparatus 1102, as can other elements of the network 1140.

The memory 1122 includes any storage device capable of storing various data and applications, including, among other things, camera data generated by the visible light camera 1112, sensors 1116, and the image processor 1110, as well as images generated for display by the image display driver 1108 on the image displays 1104. While the memory 1122 is shown as integrated with the high-speed circuitry 1118, in other examples, the memory 1122 may be an independent standalone element of the head-wearable apparatus 1102. In certain such examples, electrical routing lines may provide a connection through a chip that includes the high-speed processor 1120 from the image processor 1110 or low power processor 1128 to the memory 1122. In other examples, the high-speed processor 1120 may manage addressing of memory 1122 such that the low power processor 1128 will boot the high-speed processor 1120 any time that a read or write operation involving memory 1122 is needed.

As shown in FIG. 11, the low power processor 1128 or high-speed processor 1120 of the head-wearable apparatus 1102 can be coupled to the camera (visible light camera 1112, or infrared camera and emitter 1114), the image display driver 1108, the user input device 1106 (e.g., touch sensor or push button), and the memory 1122. The head-wearable apparatus 1102 also includes sensors 1116, which may be the motion components 1334, position components 1338, environmental components 1336, and biometric components 1332, e.g., as described below with reference to FIG. 13. In particular, motion components 1334 and position components 1338 are used by the head-wearable apparatus 1102 to determine and keep track of the position and orientation (the "pose") of the head-wearable apparatus 1102 relative to a frame of reference or another object, in conjunction with a video feed from one of the visible light cameras 1112, using for example techniques such as structure from motion (SfM) or VIO.

In some examples, and as shown in FIG. 11, the head-wearable apparatus 1102 is connected with a host computer. For example, the head-wearable apparatus 1102 is paired with the user device 1138 via the communication link 1136 or connected to the server system 1132 via the network 1140. The server system 1132 may be one or more computing devices as part of a service or network computing system, for example, that include a processor, a memory, and network communication interface to communicate over the network 1140 with the user device 1138 and head-wearable apparatus 1102.

The user device 1138 includes a processor and a network communication interface coupled to the processor. The network communication interface allows for communication over the network 1140, communication link 1134 or communication link 1136. The user device 1138 can further store at least portions of the instructions for implementing functionality described herein.

Output components of the head-wearable apparatus 1102 include visual components, such as a display (e.g., one or more liquid-crystal display (LCD)), one or more plasma display panel (PDP), one or more light emitting diode (LED) display, one or more projector, or one or more waveguide. The image displays 1104 of the optical assembly are driven by the image display driver 1108. The output components of the head-wearable apparatus 1102 further include acoustic components (e.g., speakers), haptic components (e.g., a vibratory motor), other signal generators, and so forth. The input components of the head-wearable apparatus 1102, the user device 1138, and server system 1132, such as the user input device 1106, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1102 may optionally include additional peripheral device elements. Such peripheral device elements may include biometric sensors, additional sensors, or display elements integrated with the head-wearable apparatus 1102. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 1136 from the user device 1138 via the low power wireless circuitry 1130 or high-speed wireless circuitry 1124.

Figure 12:
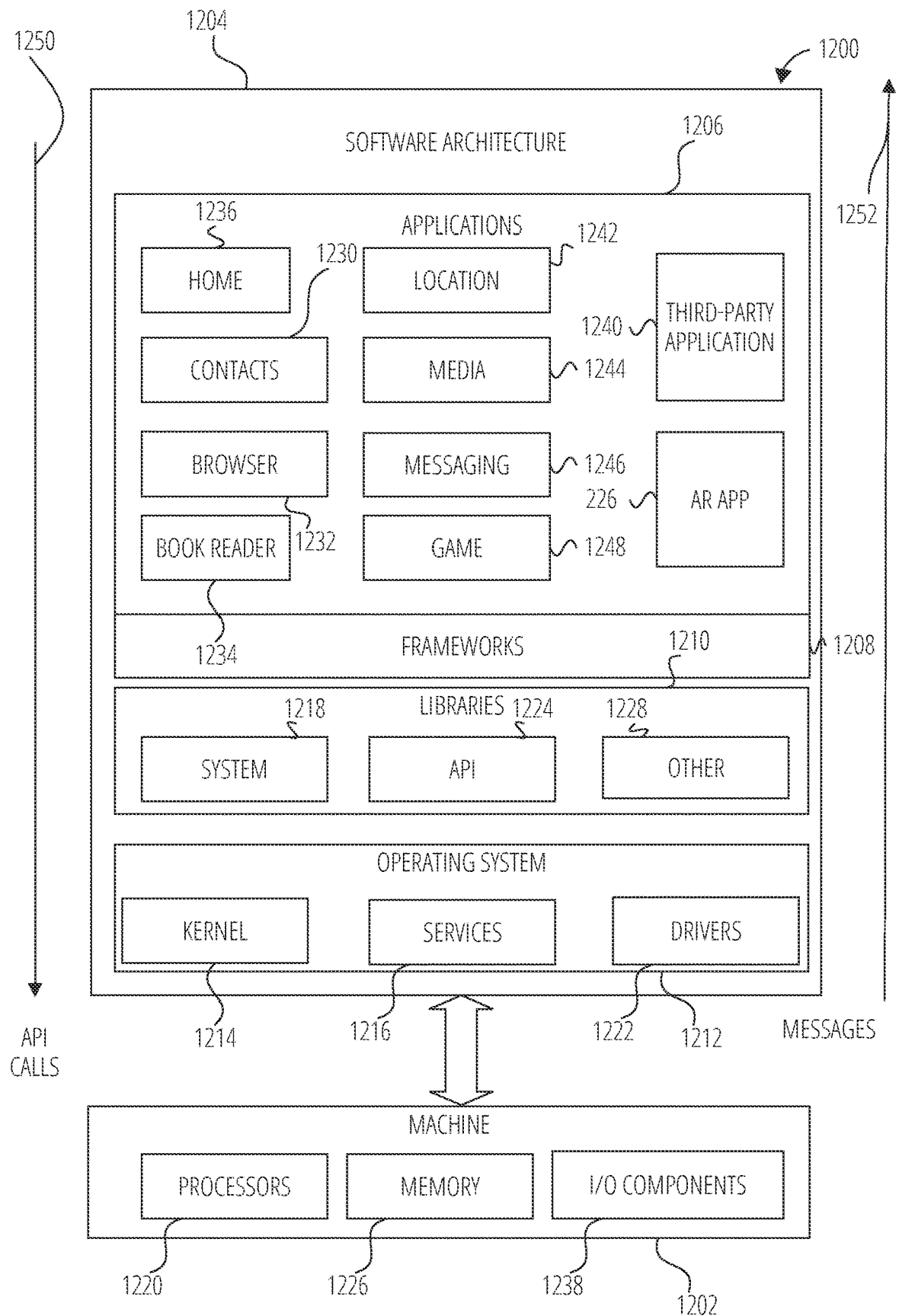
FIG. 12 is a block diagram showing a software architecture within which the present disclosure may be implemented, according to some examples.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and input/output, or I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke Application Programming Interface calls, or API calls 1250, through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionalities. The services 1216 can provide other common services for the other software layers. The drivers 1222 are responsible for controlling or interfacing with the underlying hardware. For instance, the drivers 1222 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions and three dimensions in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various GUI functions, high-level resource management, and high-level location services. The frameworks 1208 can provide a broad spectrum of other APIs that can be used by the applications 1206, some of which may be specific to a particular operating system or platform.

In some examples, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In some examples, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 12, the third-party application 1240 can invoke the API calls 1250 provided by the operating system 1212 to facilitate functionality described herein. The applications 1206 may include an AR application such as the AR application 226 described herein, according to some examples.

Figure 13:
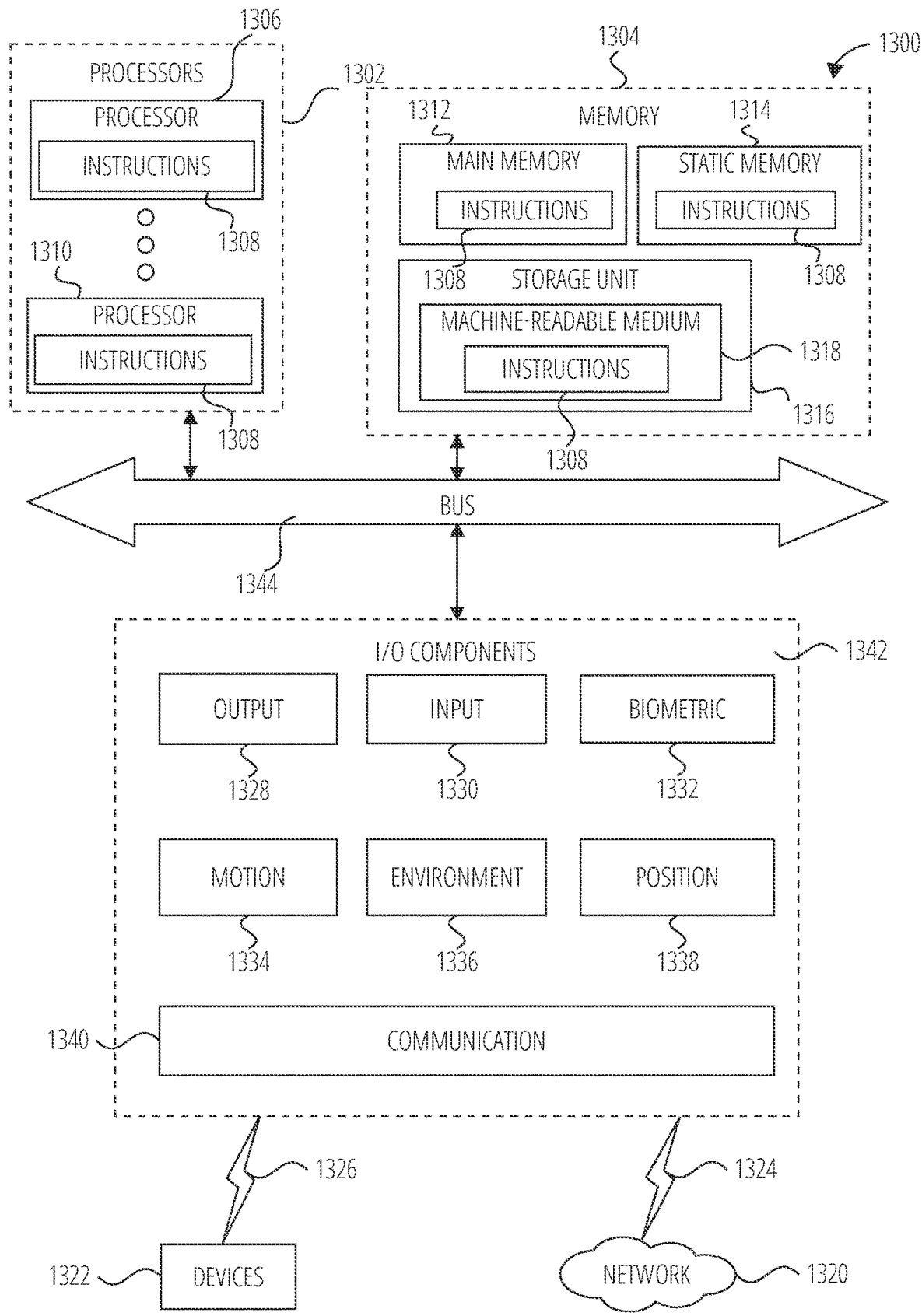
FIG. 13 is a diagrammatic representation of a machine in the form of a computer system within which a set of instructions may be executed for causing the machine to perform any one or more of the methodologies discussed herein, according to some examples.

FIG. 13 is a diagrammatic representation of a machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), XR device, AR device, VR device, a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1342, which may be configured to communicate with each other via a bus 1344. In some examples, the processors 1302 (e.g., a Central Processing Unit (CPU), a Reduced Instruction Set Computing (RISC) processor, a Complex Instruction Set Computing (CISC) Processor, a Graphics Processing Unit, a Digital Signal Processor (DSP), an Application-Specific Integrated Circuit (ASIC), a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, accessible to the processors via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors, or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones may include a touch input device or other such input mechanisms, while a headless server machine will likely not include such a touch input device. It will be appreciated that the I/O components 1342 may include many other components that are not shown in FIG. 13. In various examples, the I/O components 1342 may include output components 1328 and input components 1330. The output components 1328 may include visual components (e.g., a display such as a PDP, an LED display, a LCD, a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1342 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1342 further include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth™ components, Wi-Fi™ components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi™ signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed examples.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Conclusion

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The term "operation" is used to refer to elements in the drawings of this disclosure for ease of reference and it will be appreciated that an "operation" may identify one or more operations, processes, actions, or steps, and may be performed by one or multiple components.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, as the following claims reflect, inventive subject matter may lie in less than all features of a single disclosed example. Thus, the following claims are hereby incorporated into the Detailed Description.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method comprising: capturing, by a first extended reality (XR) device, sensory data of a wearer of a second XR device, the first XR device and the second XR device being colocated in an environment; using the sensory data to determine a time offset between a first clock of the first XR device and a second clock of the second XR device; synchronizing, based on the time offset, the first clock and the second clock; and establishing a shared coordinate system to enable alignment of virtual content that is simultaneously presented by the first XR device and the second XR device based on the synchronization of the first clock and the second clock.

In Example 2, the subject matter of Example 1 includes, causing presentation of the virtual content by the first XR device, the virtual content being presented in a same place and at a same time by the second XR device.

In Example 3, the subject matter of any of Examples 1-2 includes, wherein the sensory data comprises images of the wearer of the second XR device captured at different points in time, and the using of the sensory data to determine the time offset comprises: processing each image to determine a time-indexed position of a visual feature of the wearer of the second XR device based on the first clock; generating, based on the time-indexed position of the visual feature of the wearer of the second XR device for each image, an estimated trajectory of the second XR device; accessing a pose trajectory of the second XR device that is based on the second clock; and using the time offset to match the estimated trajectory of the second XR device with the pose trajectory of the second XR device.

In Example 4, the subject matter of Example 3 includes, wherein the matching of the estimated trajectory of the second XR device with the pose trajectory of the second XR device comprises matching each time-indexed position to a corresponding pose in the pose trajectory of the second XR device.

In Example 5, the subject matter of any of Examples 3-4 includes, wherein the establishing of the shared coordinate system comprises using the time-indexed positions and the time offset to align the pose trajectory of the second XR device with a pose trajectory of the first XR device.

In Example 6, the subject matter of Example 5 includes, wherein the aligning of the pose trajectory of the second XR device with the pose trajectory of the first XR device comprises generating an alignment transformation between a local coordinate system of the second XR device and a local coordinate system of the first XR device.

In Example 7, the subject matter of any of Examples 3-6 includes, wherein the using of the sensory data to determine the time offset comprises: identifying a plurality of candidate time offsets; for each candidate time offset, determining a correlation between the estimated trajectory of the second XR device and the pose trajectory of the second XR device; and identifying the time offset from the plurality of candidate time offsets as providing a highest correlation between the estimated trajectory of the second XR device and the pose trajectory of the second XR device.

In Example 8, the subject matter of Example 7 includes, wherein the determining of the correlation between the estimated trajectory of the second XR device and the pose trajectory of the second XR device comprises simulating alignment of the pose trajectory of the second XR device with a pose trajectory of the first XR device by using the candidate time offset to match each time-indexed position to a corresponding pose in the pose trajectory of the second XR device.

In Example 9, the subject matter of Example 8 includes, wherein the identifying of the time offset from the plurality of candidate time offsets comprises determining, based on the simulations performed for the candidate time offsets, that the time offset minimizes a pose trajectory alignment error.

In Example 10, the subject matter of any of Examples 3-9 includes, wherein the visual feature of the wearer comprises a point on a facial region of the wearer.

In Example 11, the subject matter of Example 10 includes, wherein the point is located on the nose of the wearer.

In Example 12, the subject matter of any of Examples 3-11 includes, wherein each time-indexed position comprises an (x, y) coordinate of the visual feature.

In Example 13, the subject matter of any of Examples 3-12 includes, wherein the pose trajectory of the second XR device is a sixDegrees of Freedom (6 DOF) pose trajectory, the first XR device being communicatively coupled to the second XR device to enable the accessing of the 6 DOF pose trajectory.

In Example 14, the subject matter of any of Examples 1-13 includes, wherein the sensory data of the wearer of the second XR device comprises sound generated by the wearer, the first XR device capturing the sensory data by capturing an audio signal representing the sound.

In Example 15, the subject matter of Example 14 includes, wherein the audio signal is a first time-indexed audio signal based on the first clock, and the using of the sensory data to determine the time offset comprises: receiving, from the second XR device, a second time-indexed audio signal representing the sound and captured by the second XR device based on the second clock; and comparing the first time-indexed audio signal and the second time-indexed audio signal to determine the time offset.

In Example 16, the subject matter of Example 15 includes, wherein the comparing of the first time-indexed audio signal and the second time-indexed audio signal comprises determining a cross-correlation coefficient and identifying the time offset based on the cross-correlation coefficient.

In Example 17, the subject matter of any of Examples 14-16 includes, determining a distance between the first XR device and the second XR device in the environment; and adjusting the time offset to compensate for audio latency based on the distance between the first XR device and the second XR device in the environment.

In Example 18, the subject matter of Example 17 includes, wherein the first XR device comprises a microphone array, and the determining of the distance comprises performing sound source localization (SSL).

Example 19 is a system comprising: at least one processor; and at least one memory component storing instructions that, when executed by the at least one processor, configure the system to perform operations comprising: capturing, by a first extended reality (XR) device, sensory data of a wearer of a second XR device, the first XR device and the second XR device being colocated in an environment; using the sensory data to determine a time offset between a first clock of the first XR device and a second clock of the second XR device; synchronizing, based on the time offset, the first clock and the second clock; and establishing a shared coordinate system to enable alignment of virtual content that is simultaneously presented by the first XR device and the second XR device based on the synchronization of the first clock and the second clock.

Example 20 is a non-transitory computer-readable storage medium, the computer-readable storage medium including instructions that when executed by at least one processor, cause the at least one processor to perform operations comprising: capturing, by a first extended reality (XR) device, sensory data of a wearer of a second XR device, the first XR device and the second XR device being colocated in an environment; using the sensory data to determine a time offset between a first clock of the first XR device and a second clock of the second XR device; synchronizing, based on the time offset, the first clock and the second clock; and establishing a shared coordinate system to enable alignment of virtual content that is simultaneously presented by the first XR device and the second XR device based on the synchronization of the first clock and the second clock.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method comprising:
capturing, by a first extended reality (XR) device, images of a wearer of a second XR device, the first XR device and the second XR device being colocated in an environment, and the images captured at different points in time;
using the images to determine a time offset between a first clock of the first XR device and a second clock of the second XR device by:
processing each of the images to determine time-indexed positions of a visual feature based on the first clock,
generating, based on the time-indexed positions of the visual feature, an estimated trajectory of the second XR device, and
matching, using the time offset, the estimated trajectory of the second XR device with a pose trajectory of the second XR device that is based on the second clock;
synchronizing, based on the time offset, the first clock and the second clock; and
establishing a shared coordinate system to enable alignment of virtual content that is simultaneously presented by the first XR device and the second XR device based on the synchronization of the first clock and the second clock.

2. The method of claim 1, further comprising:
causing presentation of the virtual content by the first XR device, the virtual content being presented in a same place and at a same time by the second XR device.

3. The method of claim 1, wherein the matching of the estimated trajectory of the second XR device with the pose trajectory of the second XR device comprises matching each of the time-indexed positions to a corresponding pose in the pose trajectory of the second XR device.

4. The method of claim 1, wherein the establishing of the shared coordinate system comprises using the time-indexed positions and the time offset to align the pose trajectory of the second XR device with a pose trajectory of the first XR device.

5. The method of claim 4, wherein the aligning of the pose trajectory of the second XR device with the pose trajectory of the first XR device comprises generating an alignment transformation between a local coordinate system of the second XR device and a local coordinate system of the first XR device.

6. The method of claim 1, wherein the using of the images to determine the time offset comprises:
identifying a plurality of candidate time offsets;
for each candidate time offset, determining a correlation between the estimated trajectory of the second XR device and the pose trajectory of the second XR device; and
identifying the time offset from the plurality of candidate time offsets as providing a highest correlation between the estimated trajectory of the second XR device and the pose trajectory of the second XR device.

7. The method of claim 6, wherein the determining of the correlation between the estimated trajectory of the second XR device and the pose trajectory of the second XR device comprises simulating alignment of the pose trajectory of the second XR device with a pose trajectory of the first XR device by using the candidate time offset to match each of the time-indexed positions to a corresponding pose in the pose trajectory of the second XR device.

8. The method of claim 7, wherein the identifying of the time offset from the plurality of candidate time offsets comprises determining, based on the simulations performed for the candidate time offsets, that the time offset minimizes a pose trajectory alignment error.

9. The method of claim 1, wherein the visual feature comprises a point on a facial region of the wearer.

10. The method of claim 9, wherein the point is located on the nose of the wearer.

11. The method of claim 1, wherein each of the time-indexed positions comprises an (x, y) coordinate of the visual feature.

12. The method of claim 1, wherein the pose trajectory of the second XR device is a six Degrees of Freedom (6 DOF) pose trajectory, the first XR device being communicatively coupled to the second XR device to enable accessing of the 6 DOF pose trajectory.

13. A system comprising:
at least one processor; and
at least one memory component storing instructions that, when executed by the at least one processor, configure the system to perform operations comprising:
capturing, by a first extended reality (XR) device, images of a wearer of a second XR device, the first XR device and the second XR device being colocated in an environment, and the images captured at different points in time;
using the images to determine a time offset between a first clock of the first XR device and a second clock of the second XR device by:
processing each of the images to determine time-indexed positions of a visual feature based on the first clock,
generating, based on the time-indexed positions of the visual feature, an estimated trajectory of the second XR device, and
matching, using the time offset, the estimated trajectory of the second XR device with a pose trajectory of the second XR device that is based on the second clock;
synchronizing, based on the time offset, the first clock and the second clock; and
establishing a shared coordinate system to enable alignment of virtual content that is simultaneously presented by the first XR device and the second XR device based on the synchronization of the first clock and the second clock.

14. The system of claim 13, wherein the matching of the estimated trajectory of the second XR device with the pose trajectory of the second XR device comprises matching each of the time-indexed positions to a corresponding pose in the pose trajectory of the second XR device.

15. The system of claim 13, wherein the establishing of the shared coordinate system comprises using the time-indexed positions and the time offset to align the pose trajectory of the second XR device with a pose trajectory of the first XR device.

16. The system of claim 15, wherein the aligning of the pose trajectory of the second XR device with the pose trajectory of the first XR device comprises generating an alignment transformation between a local coordinate system of the second XR device and a local coordinate system of the first XR device.

17. The system of claim 13, wherein the using of the images to determine the time offset comprises:
identifying a plurality of candidate time offsets;
for each candidate time offset, determining a correlation between the estimated trajectory of the second XR device and the pose trajectory of the second XR device; and
identifying the time offset from the plurality of candidate time offsets as providing a highest correlation between the estimated trajectory of the second XR device and the pose trajectory of the second XR device.

18. The system of claim 17, wherein the determining of the correlation between the estimated trajectory of the second XR device and the pose trajectory of the second XR device comprises simulating alignment of the pose trajectory of the second XR device with a pose trajectory of the first XR device by using the candidate time offset to match each of the time-indexed positions to a corresponding pose in the pose trajectory of the second XR device.

19. The system of claim 13, wherein the visual feature comprises a point on a facial region of the wearer.

20. A non-transitory computer-readable storage medium, the computer-readable storage medium including instructions that when executed by at least one processor, cause the at least one processor to perform operations comprising:
capturing, by a first extended reality (XR) device, images of a wearer of a second XR device, the first XR device and the second XR device being colocated in an environment, and the images captured at different points in time;
using the images to determine a time offset between a first clock of the first XR device and a second clock of the second XR device by:
processing each of the images to determine time-indexed positions of a visual feature based on the first clock,
generating, based on the time-indexed positions of the visual feature, an estimated trajectory of the second XR device, and
matching, using the time offset, the estimated trajectory of the second XR device with a pose trajectory of the second XR device that is based on the second clock;
synchronizing, based on the time offset, the first clock and the second clock; and
establishing a shared coordinate system to enable alignment of virtual content that is simultaneously presented by the first XR device and the second XR device based on the synchronization of the first clock and the second clock.

* * * * *